US007180887B1

(12) United States Patent
Schwaderer et al.

(10) Patent No.: US 7,180,887 B1
(45) Date of Patent: Feb. 20, 2007

(54) ROUTING AND FORWARDING TABLE MANAGEMENT FOR NETWORK PROCESSOR ARCHITECTURES

(75) Inventors: Curtis Schwaderer, Des Moines, IA (US); David Lyons, Des Moines, IA (US); Rick Stoen, Des Moines, IA (US)

(73) Assignee: RadiSys Patent Properties, Hillsboro, OR (US)

( * ) Notice: Subject to any disclaimer, the term of this patent is extended or adjusted under 35 U.S.C. 154(b) by 1023 days.

(21) Appl. No.: 10/037,186

(22) Filed: Jan. 4, 2002

(51) Int. Cl.
*G06F 15/173* (2006.01)
(52) U.S. Cl. .................. 370/351; 370/419; 709/201; 709/238
(58) Field of Classification Search ............. 370/359, 370/419, 462, 463, 351; 709/104, 205, 201, 709/226, 250, 202, 203, 238
See application file for complete search history.

(56) References Cited

U.S. PATENT DOCUMENTS

| 5,920,705 | A | 7/1999 | Lyon |
| 6,104,696 | A | 8/2000 | Kadambi |
| 6,421,342 | B1 | 7/2002 | Schwartz |
| 6,728,845 | B2 * | 4/2004 | Adiletta et al. ............. 711/154 |
| 6,947,425 | B1 * | 9/2005 | Hooper et al. .............. 370/394 |
| 6,976,095 | B1 * | 12/2005 | Wolrich et al. ............. 709/250 |
| 7,007,101 | B1 * | 2/2006 | Schwaderer ................ 709/238 |
| 2002/0118682 | A1 * | 8/2002 | Choe ..................... 370/395.31 |
| 2003/0041228 | A1 * | 2/2003 | Rosenbluth et al. ........ 712/220 |
| 2004/0098496 | A1 * | 5/2004 | Wolrich et al. ............. 709/230 |

FOREIGN PATENT DOCUMENTS

| EP | 0998162 A2 | 3/2000 |
| WO | PCT/GB01/00648 | 10/2001 |

OTHER PUBLICATIONS

Stefan Nilsson, IP-Address Lookup Using LC-Tries, IEEE Journal on Selected Areas in Communications.

\* cited by examiner

*Primary Examiner*—Min Jung
(74) *Attorney, Agent, or Firm*—Daniel A. Rosenberg; Kent A. Herink; Emily E. Harris

(57) ABSTRACT

A computer system having a network processor comprising a core processor and at least one microengine in operative communication with the core processor is provided. A table comprised of a plurality of entries with IP addresses associated therewith is built, wherein the entries are organized hierarchically according to an LC-Trie compression algorithm operating on the IP addresses. An Information packet is received within the computer system, wherein the information packet has a destination IP address associated therewith. The table is searched using an LC-Trie search algorithm to find a match between an IP address of an entry in the table and the destination IP address of the information packet. The information packet is transmitted to a forwarding IP address associated with the IP address of the matching entry. An interface is provided to accommodate communication between the core processor and microengine of the network processor.

23 Claims, 3 Drawing Sheets

Network Processor System Architecture w/Forwarding Table Manager

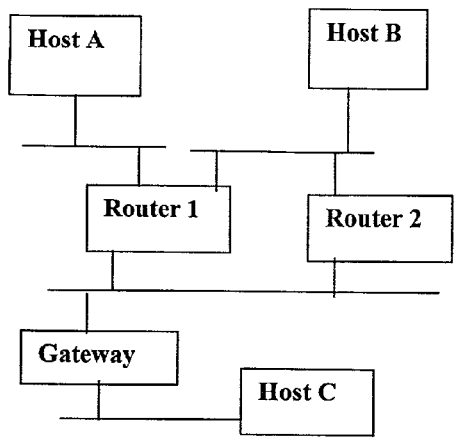
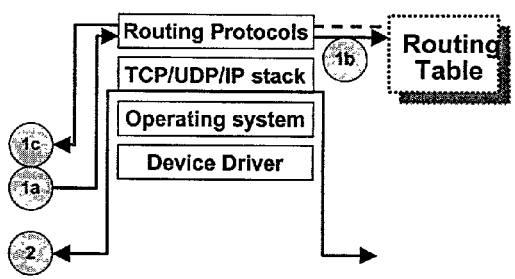
Figure 1 – Prior Art Host/Router Network
Figure 3. Prior Art Software Architecture
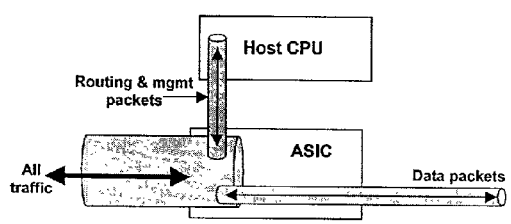
Figure 2. Prior Art Internet Infrastructure Architecture
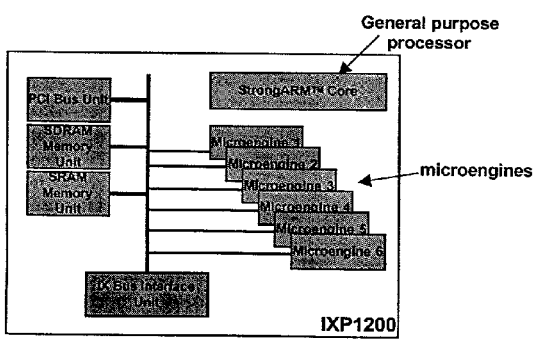
Figure 4. Network Processor System (Intel IXP1200)

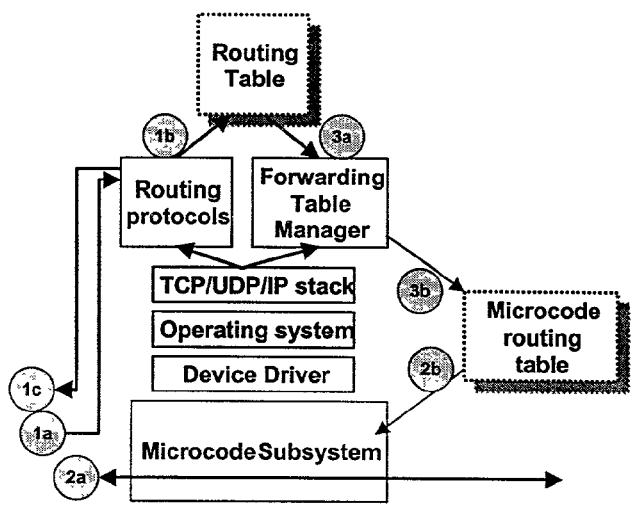
Figure 5. Network Processor System Architecture w/Forwarding Table Manager FIG. 6
a.
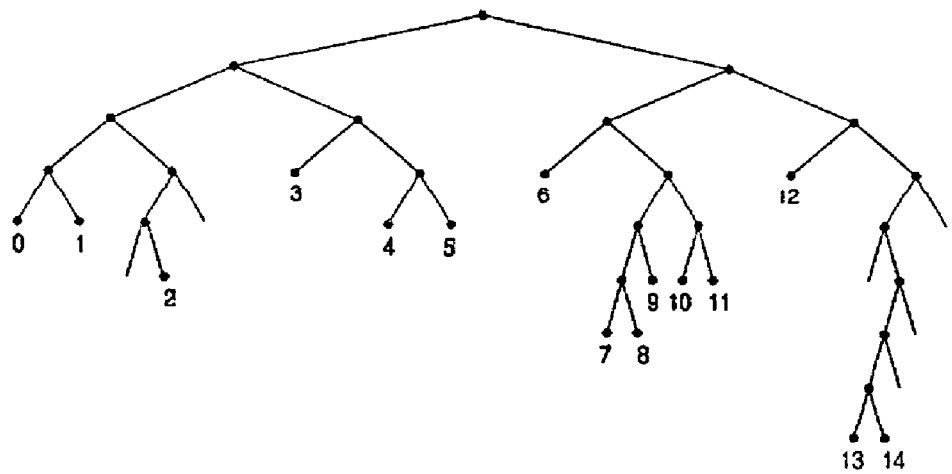
b.
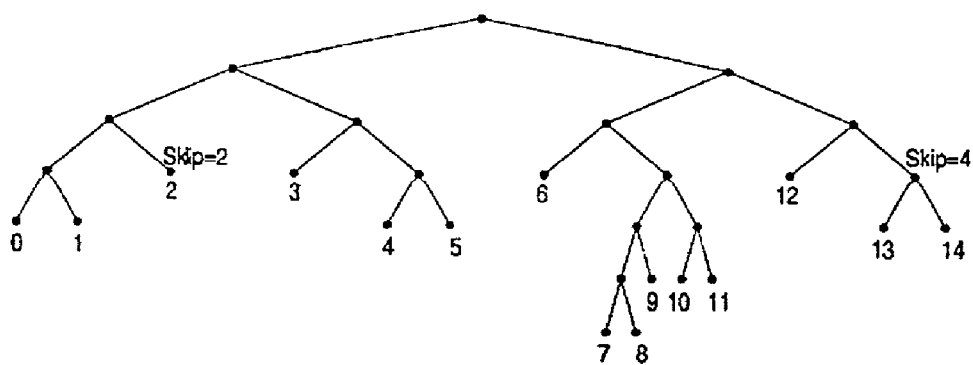
c.
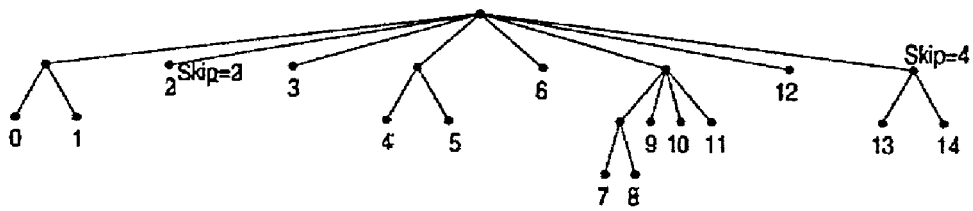

ROUTING AND FORWARDING TABLE MANAGEMENT FOR NETWORK PROCESSOR ARCHITECTURES

BACKGROUND OF THE INVENTION

1. Field of the Invention

The present invention relates to software architecture and related components that fully utilize network processors in communications equipment applications. In particular, the invention relates to a method and apparatus for forwarding information packets on a multiple element computer system that utilizes a forwarding table manager application operating on primary and secondary computing elements of the computer system.

2. Background

The infrastructure of the Internet consists of a variety of components including, principally, routers, gateways, and hosts. User communication over the Internet takes place from host-to-host. Thus, hosts comprise the beginning and end points for most Internet communication (i.e. a conference call, file transfer, email, or web browsing takes place from one user's host computer to another's host computer). Gateways simply bridge different Internet networks together. Routers identify the source and destination of each packet of information sent over the Internet, and make decision about where to send the packet so it can reach its destination most efficiently.

FIG. 1 shows an example of a basic network with three hosts, two routers, and one gateway. Notice, that if Host A wishes to reach Host B, there are two different paths that can be taken through the network—either through Router 1 or Router 2. There is only one path for Host A to reach Host C, that being through Router 1. The technicalities of router communication involve the use of "routing protocols" that generate a "routing database." The routing database stores all known host and network addresses and the routing rules for sending packets out the correct router ports to reach the address destination.

Each component of the Internet infrastructure is identified by an Internet Protocol (IP) address, which takes the general form "a.b.c.d" where a–d are integer values between 0–255. Of course, the number of "digits" in an address can vary. In addition, the address is arranged in a hierarchical manner. The leftmost number "a" typically represents the address of a large segment of Internet infrastructure, like an entire network or a system of networks that may encompass a very large number of routers and hosts. The address of each component of this network would share the same initial leftmost value. Each digit to the right of the leftmost digit in the IP address would identify a smaller and smaller segment of the network, or system, until the rightmost number would identify a single host computer. The IP address works in a manner analogous to a conventional post office address, where one component of the post office address identifies a country, the next a state within the country, then a city, and then a house on the street. The routing protocols and routing databases take advantage of a similar hierarchical structure of IP addresses to route and direct Internet communications from source to destination. In actual practice, however, the "a.b.c.d" format of the IP address is not so structured. For example, each of the individual digits of the IP address can contain information about the address of more than one segment of the Internet infrastructure. Thus, the hardware and software architecture of routers and gateways facilitate the routing and transmission of the data packets that make up the Internet communications.

The traditional hardware architecture of a router or gateway includes a general-purpose microprocessor (i.e. PowerPC, Pentium, MIPS) and an Application Specific Integrated Circuit (ASIC) generally configured in the manner shown in FIG. 2. The number of data packets passing through each router typically far exceeds the general purpose microprocessor's ability to look at the packet, determine the destination, figure out which port it must go out on, and send the packet on its way. Therefore, the ASIC performs this function on the majority of the Internet data packets. This traffic is generally called "data plane" traffic or data plane packets, i.e. traffic/packets that are not destined for the router itself, but just passing through on their way to their ultimate destination. ASICs program the "routing and forwarding" algorithms into the silicon, thereby providing very high-speed packet processing capability.

A drawback of this method comprises the fact that as these algorithms are improved, new ASIC designs must integrate the new algorithms into the silicon. This requires building new hardware, and then replacing the previous communications equipment. Essentially, the equipment must then be thrown away with each new design. This inflexible and cost-prohibitive cycle is quickly being replaced by network specific processor technology. Network processors contain a general purpose CPU and multiple computing engines called "microengines" that replace the ASIC. Instead of hard-coding packet processing algorithms into the silicon, the microengines are programmed with software called "microcode." As new algorithms are developed, new microcode can simply be downloaded into the existing microengine hardware, eliminating any hardware production expense and greatly increasing product service life.

With the new network processor paradigm comes new issues and challenges related to applying the software architecture associated with traditional hardware architecture to the new hardware paradigm. FIG. 3 shows the traditional software architecture that is used with the traditional hardware architecture described above. Generally, the software architecture needs to handle three types of information, each identified in FIG. 3 with a specific communication plane. One type of information is the information crossing the data plane, which consists of data packets that are merely passing through the processor (shown in Flow 2 of FIG. 3). The processor uses its routing information to determine where to send to the data packet such that it most efficiently reaches its ultimate destination.

Other information, however, comes into the processor besides data packets on the data plane. One such type of information is associated with the control plane (shown in Flow 1a–c in FIG. 3). Control plane information involves information directed to the updating of the routing database, or table, or information needed for the proper functioning of the routing protocols. Management plane information consists of information associated with the configuration, diagnostics, or monitoring of the processor and its activities. Flows 1a–c show the routing of control plane information through the traditional software architecture. These communications cause modifications to the routing table, and include responses to requests for routing information made by other processors. As mentioned previously, Flow 2 shows the data plane traffic that flows into the software architecture and up to the TCP/UDP/IP (Internet Protocol) block, and is then passed back down for transmission to its destination. Conventionally, all of the of the software shown in FIG. 3, and the processing of the information flows, requires the utilization of the general purpose processor.

While the network processor provides the microengines to more efficiently handle the various network communications, the traditional software architecture still requires the core processor to handle all processing. Accordingly, applying the traditional software architecture to network processors results in no performance gain due to the fact that the traditional software architecture cannot properly utilize the microengines. Thus, a need exists for a software architecture that maximizes the efficiencies of the network processors.

SUMMARY OF THE INVENTION

An object of the present invention comprises providing a method and apparatus for forwarding information packets on a computer system having a network processor with at least one microengine.

These and other objects of the present invention will become apparent to those skilled in the art upon reference to the following specification, drawings, and claims.

The present invention intends to overcome the difficulties encountered heretofore. To that end, a multiple element computer system having a primary computing element and a secondary computing element in operative communication with each other. A table comprised of a plurality of entries with addresses associated therewith is built, wherein the entries are organized hierarchically according to an LC-Trie compression algorithm operating on the addresses. An Information packet is received within the computer system, wherein the information packet has a destination address associated therewith. The table is searched using an LC-Trie search algorithm to find a match between an address of an entry in the table and the destination address of the information packet. The information packet is transmitted to a forwarding address associated with the address of the matching entry.

BRIEF DESCRIPTION OF THE DRAWINGS

FIG. 1 is a block diagram of a prior art host/router network.

FIG. 2 is a block diagram of a prior art Internet infrastructure architecture.

FIG. 3 is a block diagram of a prior art software architecture

FIG. 4 is a block diagram of a network processor system

FIG. 5 is a block diagram of a network processor architecture with a forwarding table manager FIG. 6a is a diagram of a binary tree.

FIG. 6b is a diagram of the binary tree of FIG. 6a with path compression.

FIG. 6c is a diagram of the binary tree of FIG. 6b with LC-Tri compression.

DETAILED DESCRIPTION OF THE INVENTION

In the Figures, FIG. 4 shows the architecture of a network processor made by Intel Corporation (IXP1200), of the type contemplated for use with the present invention. Those of ordinary skill in the art will understand the applicability of the present invention to other similar and related processors, and in particular network processors. The IXP1200 network processor includes a plurality of microengines (or subsystems) interfaced with the IX Bus Interface. The microengines are dynamically programmable with microcode. The microengines possess the capability of independently carrying out instructions, accessing system components via the Bus Interface, without the assistance of the StrongARM core processor. The utilization of the microengines for network processing requires the development of software architecture to support the microengines.

Accordingly, the present invention adds software components to the traditional software environment depicted in FIG. 3 and defines a table interface for the microcode running on the microengines that enables the microengines to exclusively handle the data plane communications, thereby realizing significant performance improvement over traditional network processing. In particular, FIG. 5 depicts a software block diagram of the present invention that gathers the appropriate information to enable the microcode engines to make routing and forwarding decisions utilizing information placed in a microcode routing table.

Flow 1a–c shown in FIG. 5 represents the routing of control and management communications. Flow 1a depicts the flow of routing packets as they come into the system. Flow 1b depicts the flow for routing table updates by the routing protocol, which takes place as new routes are learned and added to the routing table. Flow 1c depicts the flow for routing responses sent out to other communications equipment as necessary. Flow 2a shows that the network processor also handles the flow of data plane traffic (all traffic passing through the system and not destined for the system itself). While the network processor software architecture handles the data plane traffic using the microcode subsystem running on the microengines, in order to make correct routing decisions, the microcode must have access to routing and port information as well as any special tagging or quality of service requirements traveling along the control and management planes and normally handled by the conventional software architecture. The microcode subsystem uses a microcode routing table to carry out correct routing of data plane traffic. A forwarding table manager is responsible for identifying routing information from the standard routing table, information from the TCP/UDP/IP stack, and any special tagging requirements to generate the microcode routing table.

The forwarding table manager implements a microcode routing table based in part on the principal of LC-Tries compression of hierarchical data structures, based on the work of Stefan Nilsson and Gunner Karlsson as disclosed in a paper entitled IP-Address Lookup Using LC-Tries, dated Jul. 2, 1998, incorporated herein by reference. The following comprises a theoretical example of LC-Tries compression, and assumes the following pseudo IP address lookup table:

TABLE 1

| ENTRY NO. | PSEUDO ADDRESS |
|---|---|
| 0 | 0000 |
| 1 | 0001 |
| 2 | 00101 |
| 3 | 010 |
| 4 | 0110 |
| 5 | 0111 |
| 6 | 100 |
| 7 | 101000 |
| 8 | 101001 |
| 9 | 10101 |
| 10 | 10110 |
| 11 | 10111 |
| 12 | 110 |
| 13 | 11101000 |
| 14 | 11101001 |

Table 1 refers to the tree diagram shown in FIG. 6a. For illustrative purposes the pseudo address represents the path from the root of the tree to any particular terminal leaf, wherein a "0" represents a left-turn at any particular node, and a "1" represents a right-turn. For example, Entry No. 6 contains the pseudo address 100. This indicates an initial right-turn from the root node, and then left-turns at the next two nodes. This represents the path from the root node to the terminal leaf node corresponding to Entry No. 6 in the tree shown in FIG. 6a. In addition the entries in Table 1 are sorted by binary digit so that as many left turns are made before making any right turns. In other words, the entries are ordered from the top of the table to the bottom giving priority to the left most digits, "0" coming before "1" in each case.

The first step in compressing the tree structure comprises path compression whereby as many internal nodes (i.e. nodes that do not comprise a terminal leaf node) as possible are removed. The result of this compression is shown in FIG. 6b, with entry numbers 2, 13, and 14 compressed by the skip values (Skip) of 2 and 4 respectively. Note that not all internal nodes are removed during path compression. The internal nodes that eventually branch to at least two leaf nodes that are not siblings of the same parent node cannot be removed during path compression.

This effectively removes descendent nodes along any single path that must be traversed, and are only traversed, to reach a particular leaf node (or its immediate sibling). This effectively compresses sparsely populated regions of the tree.

A second level of compression, called level compression, effectively compresses densely 1–5 populated regions of the tree. The idea is that all siblings of a given node are removed, if and only if all of the siblings of that node are internal nodes. The removal of levels is reflected in a branching factor (Branch) that can be expressed as a power of 2 ($2^{Branch}$), due to the fact that a node always has two branches. Thus, Branch represents the number of levels removed, and $2^{Branch}$ represents the number of children of a node removed. The level and path compressed tree is shown in FIG. 6c, and data in Table 2 illustrates how to navigate the tree.

TABLE 2

| NODE NO. | BRANCH | SKIP | POINTER/ ENTRY NO. | PSEUDO ADDRESS |
|---|---|---|---|---|
| 0 | 3 | 0 | 1 | — |
| 1 | 1 | 0 | 9 | — |
| 2 | 0 | 2 | 2 | 00101 |
| 3 | 0 | 0 | 3 | 010 |
| 4 | 1 | 0 | 11 | — |
| 5 | 0 | 0 | 6 | 100 |
| 6 | 2 | 0 | 13 | — |
| 7 | 0 | 0 | 12 | 110 |
| 8 | 1 | 4 | 17 | — |
| 9 | 0 | 0 | 0 | 0000 |
| 10 | 0 | 0 | 1 | 0001 |
| 11 | 0 | 0 | 4 | 0110 |
| 12 | 0 | 0 | 5 | 0111 |
| 13 | 1 | 0 | 19 | — |
| 14 | 0 | 0 | 9 | 10101 |
| 15 | 0 | 0 | 10 | 10110 |
| 16 | 0 | 0 | 11 | 10111 |
| 17 | 0 | 0 | 13 | 11101000 |
| 18 | 0 | 0 | 14 | 11101001 |
| 19 | 0 | 0 | 7 | 101000 |
| 20 | 0 | 0 | 8 | 101001 |

The value of Node No. is determined by counting each of the nodes beginning from the root and working from left to right across each level, starting from the top level and working to the bottom level. Thus, the children of the root node are given Node Nos. 1–8 from left to right, and Node No. 9 corresponds to the leftmost child of the leftmost child of the Entry No. 0 in Table 1 (the root node), and so on. As discussed hereinabove, the value of Branch equals the number of levels removed between the current node and its children due to level compression, and $2^{Branch}$ equals the number of children of the node. Additionally, the number Branch also equals the number of bits of the pseudo address needed to uniquely identify all the given children of a particular node. Again, as discussed hereinabove, the value of Skip equals the number of internal nodes removed during path compression. The value of Pointer/Entry No. has two uses. If the particular node is an internal node (Branch 0) then the value Pointer/Entry No. represents the Node No. of the leftmost descendent of the particular node. In this case, Pointer/Entry No. is a pointer to another entry in Table 2. If the particular node is a leaf node (Branch=0) then the value of Pointer/Entry No. represents the Entry No. of an entry in Table 1 (for the sake of convenience, the Table 1 Pseudo Address information is entered in the last column of Table 2 for each entry in appearing in Table 1). Of course, purely internal nodes do not have an external Pseudo Address associated with them, and this is represented by the entry in the Pseudo Address column of Table 2.

To conceptually illustrate the method for searching the compressed LC-Tries, consider a search for the binary string "10110111" in the compressed LC-Trie of FIG. 6c using the information in Table 2. Beginning at the root node (Node No. 0), the Branch value is "3" and the value of Skip is "0". This indicates three levels of the tree have been removed under the root node, representing the removal of $2^3$ ("8") descendent nodes. No nodes have been skipped. This means that the first three bits of the search string contain the information removed by compression. The decimal equivalent of the first three bits of the search string ("101") equals 5, adding this value to the value ("1") stored in the Pointer/ Entry No. column for the root node yields the Node No. ("6") of the next entry in the table. Due to the fact that Branch does not equal "0" the value in Pointer/Entry No. is a pointer and not the entry number of a leaf node. Thus, the LC-Trie compression information represented in Table 2 directs the search to next node in the compressed LC-Trie. Performing these steps again on the information in Table 2 for Node No. 6, yields a Branch of "2" and a Skip of "0". Thus, the decimal equivalent of bits 4–5 (the next two bits) of the search string is "2" and adding this to the value ("13") in the Pointer/Entry No. column for the row with Node No. 6 yields "15". Since the Branch factor still does not equal "0" this points to Node No. 15 as the next step in the LC-Trie. Table 2 reveals that the Branch value for Node No. 15 equals "0" indicating that this is a leaf node. The Pointer/Entry No. for Node No. 15 equals "10" and the Pseudo Address is "10110" which is the most significant prefix match for the search string of "10110111".

The preferred implementation of the present invention utilizes Microware Systems Corporations OS-9 operating system, Berkeley Standard Distribution (BSD) version 4.4 TCP/UDP/IP stack, RIP and OSPF routing protocols, and the Microware Microcode Solutions Library for the Intel IXP1200 network processor. While these components were used to develop and implement the present invention, those of ordinary skill in the art will understand that invention applies to any operating system (real-time or non-real-time), any protocol stack, any routing or addressing protocols, and any software that runs on network processor microengines.

The preferred embodiment of the forward table manager (FTM) consists of a FTM application that runs on either Microware Systems Corporation's OS-9 real-time operating system, or Linux. As shown in FIG. 5, The FTM application interfaces with the various software components of the network processor to extract all of the information necessary to complete data plane communications. This information is stored in a Microcode IP routing table called a Forwarding Table, which is based on a specialized implementation of the LC-Trie compression algorithm disclosed hereinabove. FTM application routines for querying the Forwarding Table for the purpose of routing data packets can be accomplished by a low level driver through command line options. The low level driver can run on the same processor segment as the FTM application, or on a completely separate microcode subsystem as is the case with the IXP1200 network processor. In fact, the FTM application itself could be run from a different processor than the network processor, or it could run from the network processor. The method of the present invention can be utilized on a computer system with multiple computing elements, wherein the method is carried out between a primary computing element and a secondary computing element. Using the network processor as an example, the core processor would comprise the primary computing element, and the microengine(s) would comprise the secondary computing element(s). The invention, however, is not so limited. The multiple computing elements could reside on the same microprocessor, on different microprocessors, or on different computing devices within the computing system.

In any event, by utilizing the FTM application routines the low level driver can perform data plane routing without assistance of the entire network software architecture, and in this manner substantially reduces the overhead associated with managing data plane communications.

Upon initialization the FTM application, which comprises the central feature of the Forwarding Table Manager shown in FIG. 5, queries the system to determine all of the existing IP addresses, routing information, and layer 2 machine addresses—for example, the Media Access Control (MAC) address for Ethernet. The application then allocates memory for two tables and fills them with the current information according to the method of the present invention. The tables are stored in any memory area accessable by the microengines. The application also registers with the various components of the system for all the required types of notifications to ensure the tables remain consistent and up to date with those maintained by the network stack of the system.

The two tables allocated by the application collectively comprise the Microcode Routing Table shown in FIG. 5. The tables contain a search tree represented internally using the LC-Trie path and level data compression algorithm described hereinabove, and a next-hop table. In the preferred embodiment of the invention these two tables contain a fixed number of entries and cannot be dynamically resized after initially allocated. The FTM application includes command line options to alter the default sizing options for these tables used upon initialization.

In general, upon receipt of an IP packet, the operation of the FTM application reads the destination IP address of the packet and then searches the tables to locate the next-hop destination address. This may be the final destination of the packet, or just the address of another router that can then forward the packet on along toward its final destination. The search by the FTM application will result in one of three possible outcomes depending on the state of the tables in relation to address searched: (1) no route for destination found; (2) route found but layer 2 information not valid; (3) route found and layer 2 information valid.

In the first case, the application could just drop the packet, or pass the packet back up through the network stack for processing. The latter case is preferable in that the system can issue an error message back to the originating host indicating that no route was found for the packet. In the second case, this situation would arise most frequently when the next-hop address points to a router on a local Ethernet with no MAC information, or the router is connected via an Asynchronous Transfer Mode (ATM) network connection and no circuit has been established. In this situation the FTM application would pass the packet back up the networking stack of the system to attempt to resolve the layer 2 information. For example, the system could broadcast an Address Resolution Protocol (ARP) request in the case of Ethernet. If the systems can validate the layer 2 information the system notifies FTM application for updating the tables for use in forwarding future packets. The third case represents the desired final outcome. In this instance the FTM application locates in the forwarding tables all of the information necessary to immediately send the packet to the correct destination through the correct port.

In more particular detail, the FTM application includes several command line options used upon invoking the application to control its operation. The protocol for calling the FTM application comprises a call to FTM[<Options>], where the Options consist of -t [size, the size of the LC-Trie (default=100,00 entries)]
-n [size, size of the next-hop table (default=50,000 entries)]
-f [number, fill factor (default=0.50)]
-r [number, root branching factor (default=16)]
-c [enables cache flushing (on by default for the IXP1200)]
-d [increase/decrease the debugging level (5 levels)]
-i [running on IXP1200 (set only when running Linux)]
-p [seconds, ARP table polling interval (default=30]

By default the LC-Trie search table holds 100,000 entries. There is no maximum value for this parameter; the only limit is the amount of available memory. Each of the entries comprises 4 bytes, for a total default memory usage of 400,000 bytes. A rough estimate of the space needed for the search table consists of 2 to 3 times the maximum number of IP routes, plus any additional space resulting from the root branching factor (explained in detail hereinbelow). Also, as explained hereinbelow, the fill factor and the organization of routes within the search table can greatly effect the amount of memory required for the search table.

By default the next-hop table holds 50,000 entries. As with the search table, the actual size of the next-hop table is only limited by the amount of available memory. Each entry comprises 16 bytes, for a total default memory usage of 800,000 bytes. The total number of routes plus the number of unique routers referenced by those routes roughly equals the required size of the next-hop table. For example, if the routing table includes 5 routes going to router A, and 3 routes going to router B, then the total number of entries in the next-hop table equals 10 (5 routes to A, plus 3 routes to B, plus routes to A and B).

The fill factor is an optimization parameter that allows for increasing the speed of searches, at the expense of creating a larger LC-Trie search table. The fill factor is a number between 0 and 1 that represents a percentage. The default factor is 0.5, or 50 percent fill factor. Understanding the effect of the fill factor requires first recalling from the discussion, of the theoretical implementation of the LC-Trie hereinabove, that the branching factor represents the amount of level compression. The value of Branch equals the number of levels skipped, and $2^{Branch}$ equals the number of nodes removed between any two nodes during level compression. Because the implementation assumes that each node has two children, representing one bit of information, namely, either a left turn or a right turn, eliminating a level is possible only if the number of children of remaining level equals a power of 2. Thus, referring to FIG. 6c, the root node includes $2^3$ (8) children, and all of the remaining nodes with children include either $2^1$ (2) or $2^2$ (4) children. The value of level compression arises from remembering that moving from one level to another in the LC-Trie represents one memory access. In an uncompressed LC-Trie, each bit of the search string represents one level of the LC-Trie, and, therefore, one memory access. Level compression groups together several bits of the search string and allows one memory access to process several bits of information in the search string at one time, thereby reducing the number of memory accesses necessary to complete the search. Thus, level compression proves very important in improving routing performance. However, the fact that each node needs exactly $2^{Branch}$ children may prevent level compression and thereby prevent taking advantage of the reduced search advantage. The fill factor allows for adding artificial dummy nodes to allow for compression of level that would not otherwise satisfy the requirement that each node needs exactly $2^{Branch}$ children. For example, if compression of two levels would leave a node with only 6 children, compression would ordinarily not take place. The fill factor allows for adding two dummy nodes to bring the total number of children nodes to 8 so the compression can take place. The value assigned to the fill factor comprises a threshold level for determining whether to fill in a level with dummy nodes. In the previous example, a level with 6 children is 75 percent full (wherein 8 would comprise a full level). If the fill factor equals 0.75 or less then the level is filled with 2 dummy nodes and the compression takes place. Thus, the larger the fill factor the less compression that will take place. This will result in longer searches, but will conserve space in the search table by not creating dummy entries. The smaller the fill factor the faster search will take place, but will result in a larger search table. Experimentation may be required to determine the best setting for the fill factor depending on the exact circumstances of any specific implementation.

The root branching factor consists of a special implementation of the fill factor applied to the root node. The root branching factor forces the root branch to have $2^k$ children, where k equals the root branching factor. The default value for the root branching factor is 16.

The cache flushing value provides protection to ensure that any changes to the search LC-Trie and next-hop tables stored in cache memory are immediately flushed to the appropriate permanent memory location. The OS-9 operating system automatically enables cache flushing when it detects it is running on an IXP1200 network processor. The Linux implementation of the present invention requires locating the tables in non-cached memory, which nullifies the cache flushing option. However, in those implementations that store the tables in cached memory and other portions of processor can view the tables directly from permanent memory, the cache flushing option should be set to avoid problems associated with stale data.

Currently the FTM application includes 5 debugging levels. The debugging option can be specified between one and five times on the command line to select the different levels as desired.

The IXP1200 option is for the Linux implementation, OS-9 automatically detects if it is running on an IXP1200 network processor. Setting this option will allow for proper configuration of the port numbers in the next-hop table. The port numbers are assigned differently on the IXP1200.

The ARP table polling option is also for the Linux implementation. Because the Linux implementation of the FTM application does not receive direct notification of changes to the ARP layer 2 information, this option allows the FTM application to poll the Ethernet ARP cache at a set time interval. The OS-9 implementation uses bus line snooping to monitor the network stack, which alleviates the need to poll the ARP cache.

The FTM application includes the ability to respond to certain signals from outside the application to cause the application to perform certain tasks. A SIGINT signal causes the application to print the current LC-Trie search table, and the next-hop table. A SIGUSR1 and SIGUSR2 signal causes changes in the debugging level, the former signal increments the debugging level, while the latter decrements the level. If the FTM application was initially called with no debugging enabled, then incrementing the level will enable debug level 1. If two -d options were specified in the FTM application command line, then incrementing the level will enable debug level 3. If the debug level is set at 5 (the highest level), additional signals to increment the level will have no effect. Similarly, if the debug level is 0, then signals to decrement the level will be ignored.

The following discussion describes the design and implementation of the search table and the next-hop table. In particular, this information relates to how the FTM application receives the required information to build the tables, the data structure of the tables, and the algorithms used to build and search the tables.

The tables used by the FTM application reside in memory shared by the FTM application and the process performing the data packet forwarding. The packet forwarding process can only read the tables, but cannot make changes to the tables. The FTM application performs all of the administrative functions, like adding and deleing entries from the tables.

Again, the microcode routing table used by the FTM application consists of two components: (1) the LC-Trie search table; and (2) the next-hop table. The LC-Trie search table comprises the main data structure used to store and search for IP addresses by the FTM application. The LC-Trie search table is very efficient data structure for performing the longest possible prefix matches of IP addresses used to locate the forwarding address of a data packet. Each node of the LC-Trie is represented in memory by a 4-byte entry in the search table. As disclosed in reference to the foregoing theoretical implementation, each entry in the search table includes a branching factor (Branch), a skip value (Skip), and a value that represents either a pointer into the LC-Trie itself or an offset into the next-hop table (Pointer/Entry No. in Table 2). Thus, each 4-byte LC-Trie entry takes the following form:

| 5 BITS | 7 BITS | 20 BITS |
|---|---|---|
| Branching Factor | Skip Value | LC-Trie/Next-Hop Offset |

Again, the branching factor indicates the number of levels removed during level compression, and $2^{Branching\ Factor}$ indicates the number of children of the node removed. The skip value indicates any path compression. Thus, the FTM application can process Branch+Skip bits of the search string in a single search step. The LC-Trie/Next-Bit Offset (Pointer/Entry No.) indicates the location of either the next entry in the search table matching the search string (if Branch 0), or the offset into the next-hop table entry containing the forwarding IP address (if Branch=0).

The goal of the searching the LC-Trie is to find the entry in the next-hop table that has the longest prefix of matching bits in common with the search tree. The incoming data packet will be sent to the forwarding IP address stored in this entry, which should most directly route the data packet to its ultimate destination. However, it is important to note that it is not necessary to exactly match the entire search string a destination IP address. All that is required is to match the network portion of the address. For example, if a route for the IP address of 172.16.192.0 with a network mask of 18 bits is in the table, this will match the network portion of both the IP address 172.16.224.14 or the IP address 172.16.120.39, while not matching either address exactly, as illustrated by the following table.

| DECIMAL | BINARY (NET MASK BITS) |
|---|---|
| 172.16.192.0/18 | 10101100 00010000 11000000 |
| 172.16.224.14 | 10101100 00010000 11100000 |
| 172.16.120.39 | 10101100 00010000 1111000 |

Next, turning to the next-hop table, this table contains the actual information necessary to forward a data packet to another host/router. The search of the LC-Trie search table returns an offset into the next-hop table. The actual next-hop entry consists of a 16-byte entry that takes the following form:

| Offset 0 | | | IP Address | |
|---|---|---|---|---|
| Offset 4 | Mask Length | Flags | Next-Hop Backup Offset | Port Number |
| Offset 8 | | | Port Specific | |
| Offset 12 | | | Port Specific | |

The IP address occupies the first 4 bytes, and consists of the full layer 3 address of the entry. The mask length occupies 5 bits, and indicates the number of bits in the network mask associated with the entry. In other words, the rightmost portion of the IP address identifies the network associated with the address, while the remainder of the address identifies a particular host computer on that network. The mask length determines the number of bits used to identify the network, upon conversion of the address to a binary equivalent number. Depending on the setting of the flags the mask length entry may be ignored. If the flags field indicates that the entry is a host computer the mask length is not used, because all host entries assume a mask length of 32 bits. The number of bits used for the mask length field length can be increased to 7 bits to handle IPv6 addresses if necessary.

The flags field occupies 5 bits, however, only bits 0 and 1 are used, the remainder of the bits are reserved. Bit 1 is the network bit. If the bit is set (equals 1), this indicates the entry is a network route. In this situation, one more hop in the next-hop table is required in order to reach the appropriate layer 2 information for the entry (i.e. the MAC layer information for Ethernet), the port specific field of the current next-hop entry will contain the offset to the next-hop entry that stores the correct layer 2 information. If bit 1 is not set then the entry is a host route, and the port specific field will contain the layer 2 address information for the entry. Bit 0 is the valid bit. If the bit is set then any layer 2 information in the port specific field is valid. If the bit is not set this indicates that there is a problem with the layer 2 information, either it is missing, or is out-dated. If the network bit is set, then the valid bit is not relevant. The valid bit only relates to the validity of layer 2 information, and not to offsets into the next-hop table.

The next-hop backup offset field occupies 14 bits, and is used in special situations where the search algorithm proceeded too far down the LC-Trie. This can occur do to the fact that the LC-Trie search algorithm tries to find the entry with the largest prefix of bits that match the search string, and the fact that the LC-Trie search algorithm terminates the search only when it reaches a leaf node. In rare instances, the search algorithm can pass by a correct match, only to identify a match that may be technically the best match, but for practical purposes is not an acceptable match.

In the IP address application, consideration needs to be given to the network mask length as it affects the search algorithm. In the IP address search, the goal is to not just match the largest prefix of bits, but to match the number of bits in the network mask for an entry. Consider an example based on the following Table 3:

TABLE 3

| | DECIMAL | BINARY |
|---|---|---|
| Search String | 172.16.130.44 | 10101100 00010000 10000010 0101100 |
| Entry 1 | 172.16.0.0/16 | 10101100 00010000 00000000 00000000 |
| Entry 2 | 172.16.192.0/18 | 10101100 00010000 11000000 00000000 |

The table shows a search string with the IP address 172.16.130.44, followed by its binary equivalent. The binary equivalent is obtained by converting each component of the decimal IP address to an 8 bit binary number. The table includes two entries, and for purposes of this example Entry 1 is the parent of Entry 2 in the LC-Trie. Entry 1 has a network mask length of 16 bits, and Entry 2 has mask length of 18 bits. Of course, the first 16 bits of both Entry 1 and Entry 2 match the search string. However, the largest prefix match would occur between the search string and Entry 2 (the first 17 bits of both binary strings match). Thus, the LC-Trie search algorithm would pass through Entry 1 on its way to match the search string with Entry 2. This produces an undesirable result in that the network mask length for Entry 2 is 18 bits, and Entry 2 and the search string only match to 17 bits. Thus, the match provided by the search algorithm would not identify the correct network. The network mask length number of bits of the parent entry (Entry 1), however, does match the first 16 bits of the search string. In this case, the correct match is the parent entry (Entry 1) or the entry (Entry 2) actually found by the search algorithm. This happens because the search algorithm is trying to match the largest prefix. To address this situation, once the search algorithm reaches the bottom of the LC-Trie and the number of bits in common between the entry and the search string does not equal at least as many bits as the network mask length, the algorithm looks back up the tree to attempt to find a match that does meet this criteria. For this reason, the next-hop backup offset stores the offset of the parent of the current entry. This occurs in rare instances in actual practice, the notable case comprises the default route. Because the network mask length of a default route is always smaller than any other route, the default route will always be a network mask length prefix match of all of the descendent routes.

The port number field occupies 8 bits, and is used to give the FTM the correct information to communicate with the rest of the network processor. The configuration of the port number generally will take on one of two forms depending on the nature of the interface between the microengine running the FTM application and the rest of the network processor. If the IX bit is set, then the FTM application is using the IX bus (see FIG. 4) and the port number field is configured as shown below.

| BIT 7 | BIT 6 | BIT 5 | BIT 4 | BIT 3 | BIT 2 | BIT 1 | BIT 2 |
|-------|-------|-------|-------|-------|-------|-------|-------|
| IX    |       | MAC Number |   |       | Unit Number |   |       |

The port number contains the IXP1200 interface MAC number and unit number. If the bit is not set, this indicates that the interface is not on an IX bus. In this case the configuration of the port number takes the following form.

| BIT 7 | BIT 6 | BIT 5 | BIT 4 | BIT 3 | BIT 2 | BIT 1 | BIT 2 |
|-------|-------|-------|-------|-------|-------|-------|-------|
| IX    |       |       | Interface Index |  |    |       |       |

Bits 0–5 contain the interface index number of the interface used to communicate between the microengine running the FTM application and the rest of the network processor. Of course, the format of this field can and will vary to accommodate other, and newly emerging, address protocols and associated information.

The port specific field consists of 8 bytes, and is used to store either the next-hop offset or the layer 2 information depending on the flag setting. If the flag bit is set, indicating that the entry is a network route, the port specific field contains the offset into the next-hop table containing the layer 2 information. In that case the configuration of the next-hop table entry takes the following form.

| Offset 0  |             | IP Address |                        |             |
|-----------|-------------|------------|------------------------|-------------|
| Offset 4  | Mask Length | Flags      | Next-Hop Backup Offset | Port Number |
| Offset 8  |             | Next-Hop Table Offset |             |             |
| Offset 12 |             | Not Used   |                        |             |

It is possible to store the layer 2 information in the actual entry, however, for practical purposes it proves more efficient to create a separate entry in the next-hop table for network route layer 2 information. In practice, it frequently occurs that several entries in the next-hop table may have the same next-hop layer 2 address information. Storing that address separately in a single entry makes updating the entry simpler. If the address changes, the system only needs to locate and correct a single entry, rather than search every entry to find all the entries that need updating.

If the flag is not set, indicating the entry is a host route, and the port specific field will contain the layer 2 address information for the entry. In that case the configuration of the next-hop table entry takes the following form.

| Offset 0  |             | IP Address |                        |             |
|-----------|-------------|------------|------------------------|-------------|
| Offset 4  | Mask Length | Flags      | Next-Hop Backup Offset | Port Number |
| Offset 8  | Byte 1      | Byte 2     | Byte 3                 | Byte 4      |
| Offset 12 | Byte 5      | Byte 6     | Byte 7                 | Byte 8      |

In the case of Ethernet, the port specific field contains the 6-byte MAC address. For an ATM network, the port specific field would contain an encoded VCI/VPI circuit number. In any event, no processing or interpretation of this data is ever done by the FTM application. It is always treated as 8 individual bytes to prevent endian problems associated with those processors that do not allow for indiscriminate segmentation of data.

The port specific field can vary in length, and in function, from that described hereinabove, in that it can function as an opaque data field that can store a wide array of specialized packet processing parameters. For example, the port specific field can also include information related to quality of service parameters, encryption handling parameters, multi-protocol label switching (MPLS) tags, or virtual LAN (VLAN) tags, and the like.

The following discussion describes the structure and core activities of the FTM application. The FTM application is primarily responsible for building, searching, and maintaining the search table and the next-hop table. This includes activities like adding, updating, and deleting entries based on new routing information and changes in routing information, and maintaining layer 2 network information. In order to conduct these activities the FTM application needs to communicate with the network stack through the operating system. Due to the fact that the FTM application runs on different operating systems the protocol for performing the FTM applications may vary from operating system to operating system. In order to minimize these variations the FTM application is implemented in two distinct components. First, an operating system independent application program interface (API) implements a set of core functions that perform the table manipulations. Second, an operating-specific component translates the information required to perform the core functions from the rest of the system into a form suitable for core functions.

The core functions that manipulate the underlying search and next-hop tables are called by the operating system, and include the following routines. An FTMAddRoute function adds a route to the search/next-hop tables and utilizes four parameters: (1) a destination IP address—the destination network or host associated with a route, it is passed as a pointer to an conventional in_addr structure; (2) gateway IP address—the address of he next hop associated with the route, also a pointer to an in_addr structure; (3) network mask length, passed as an integer; and (4) port number, valid port numbers are between 0–255. The FTMAddRoute function can fail either because the route being added already exists, or the search/next-hop tables is/are full.

An FTMDelRoute function deletes a route from the search/next-hop tables. The function uses the same parameters, except that the port number is not required. The only time the FTMDelRoute function can fail is if the route being deleted is not present.

An FTMAddMAC function fills the port specific field with opaque data, which most typically consists of layer 2 information. The FTM application does not interpret the MAC information, but simply stores the information for return when queried. The function uses three parameters: (1) destination IP address—the IP address associated with the layer 2 MAC information, passed as a pointer to an in_addr structure; (2) data pointer—an unsigned character pointer that points to the layer 2 information; and (3) size—the number of bytes used by the layer 2 information pointed to by the data pointer, currently limited to 8 bytes. If more than 8 bytes are needed to store the layer 2 information, the data pointer could point to an index in a table of sufficient size to store the data. The FTMAddMAC function can fail if the next-hop table is full, or the layer 2 information passed in to the function exceeds 8 bytes.

An FTMDelMAC function deletes layer 2 information. The only parameter required by the function is the destination IP address associated with the layer 2 information. The function does not actually delete the layer 2 information, but marks the entry as invalid. The function may fail if the destination IP address is not found in the next-hop table, or if the entry is already invalid.

An FTMQuery function performs a search of the search/next-hop tables. The function takes a single parameter in the form of an IP address passed in to the function as a pointer to an in_addr structure. The function returns one of three possible results: (1) an error if no route exists for the IP address; (2) an error if the route exists but is invalid; and (3) a success when an IP address is found with valid layer 2 information. In the first instances a NULL is returned. In the last instance a pointer to the next-hop table entry is returned.

An FTMQueryRT function performs a search of the search/next-hop table that can distinguish between the first two results of an FTMQuery function call. In other words, the FTMQueryRT function allows for distinguishing between a route that does not exist, and one that exists but contains invalid layer 2 information. The FTMQueryRT returns a NULL value if route does not exist. If the route exists, the function returns a pointer to the next-hop table entry, at which point a user can examine the valid bit to determine if the entry contains valid layer 2 information.

On the operating system specific side, the FTM application needs to communicate with the network stack along the control and management planes in order to access information, or send requests for information, necessary to update and maintain the search and next-hop tables. Again, this portion of the application is operating system specific. Referring to OS-9, OS-9 systems use BSD (Berkeley Software Distribution) Unix-style routing domain sockets to send and receive configuration changes to and from the network stack. The FTM application opens a routing socket and simply reads all messages, but only pays attention to two types of messages, namely, the RTM_ADD and RTM_DELETE messages. Once the FTM application detects a message of interest, it parses the content of the message calls the appropriate core function (FTMAddRoute, FTMDelRoute, FTMAddMac, FTMDelMac) to affect the change to the search/next-hop tables.

In OS-9, a RTM_ADD message is sent by SPIP (the IP protocol layer) whenever a new route is added to the routing table, or upon updating layer 2 information. In either case the message will have an RTA_DST field containing the IP address associated with the entry. The message will also have an RTA_GATEWAY field, which will allow for distinguishing between adding a new route, and updating layer 2 information. The value of the AF_FAMILY field of the RTA_GATEWAY SOCKADDR will distinguish between the two tasks. If the AF_FAMILY field equals AF_INET, a route is being added. If the value equals AF_LINK, a layer 2 entry is being added. The following examples illustrate the two types of command line commands followed by the resulting RTM_ADD message generated by OS-9.

```
Command - route add - net 192.168.9 172.16.5.88 255.255.255.192
Type:    RTM_ADD
Flags:   RTF_UP RTF_GATEWAY
Address Bitmask:    RTA_DST   RTA_GATEWAY   RTA_NETMASK
    RTA_DST:         10 01 00 00 c0 a8 09 00 00 00 00 00 00
                     00 00 00
        SIN_FAMILY:  AF_INET
        SN_ADDR:     c0 a8 09 00
    RTA_GATEWAY:     10 02 00 00 ac 10 05 58 00 00 00 00 00
                     00 00 00
        SIN_FAMILY:  AF_NET
        SIN_ADDR:    ac 10 05 58
```

-continued

```
    RTA_NETMASK:     08 00 00 00 ff ff ff c0
        SIN_LEN:     8
        SIN_ADDR:    ff ff ff c0
Command - arp - _—s 192.168.3.141 00:11:22:33:44:55
Type:   RTM_ADD
Flags:  RTF_HOST
Address Bitmask:    RTA_DST   RTA_GATEWAY
    RTA_DST:         10 02 00 00 c0 a8 03 8d 00 00 00 00 00
                     00 00 00
        SIN_FAMILY:  AF_INET
        SIN_ADDR:    c0 a8 03 8d
    RTA_GATEWAY:     14 12 03 00 06 00 06 00 00 11 22 33 44 55
                     00 00 00
                     00 00 00
        SDL_LEN:     0x14
        SDL_FAMILY:  AF_LINK
        SDL_INDEX:   3
        SDL_TYPE:    IFT_ETHER
        SDL_ALEN:    6
        SDL_DATA:    00 11 22 33 44 55
```

The FTM application treats the layer 2 information as opaque data. The MAC address 00:11:22:33:44:55 in the SDL_DATA field is treated as an unsigned character array containing 6-bytes of data. This allows the FTM application to process all types of data without any special knowledge of the each specific type of interface used in a system.

In OS-9, an RTM_DELETE message is sent by SPIP whenever a route is deleted from the routing table, or a layer 2 entry is deleted. The data contained in the message is the same as the data in the RTM_ADD message, except that the Type filed contains RTM_DELETE.

The Linux and OS-9 implementations differ in that Linux does not support BSD routing domain sockets. Linux uses a similar mechanism called netlink sockets. The netlink sockets, however, can only receive route additions and deletions. This requires obtaining the layer 2 information by other means.

In particular, the last option in the command line call to the FTM application sets a polling interval for checking for new entries in the Ethernet ARP cache. The polling allows the FTM application to know when the ARP cache changes, this information is used in combination with a Unix domain socket mechanism that allows the ATM network subsystem to add and delete layer 2 information. The mechanism uses the netlink socket concept by sending the netlink RTM_NEWNEIGH and RTM_DELNEIGH messages to the /TMP/ATMPROXY Unix domain socket. The FTM application opens the socket, reads the messages, and calls the appropriate core function (FTMAddMac or FTMDelMac) to make the changes to the layer 2 information.

Linux systems generate a RTM_NEWROUTE message when new routes are added to the system, and a RTM_DELROUTE message when a route is deleted. The following examples illustrate the two types of command line commands followed by the resulting message generated by Linux.

```
Command - route add - net 192.168.9.0 netmask 255.255.255.192 gw
172.16.5.88
Type:   RTM_NEWROUTE
Netmask Length:  26
Family:  AF_INET
    RTA_DST:         00 08 00 01 c0 a8 09 00
        RTA_LEN:     8
        RTA_TYPE:    RTA_DST   (1)
        DATA:        c0 a8 09 00 (192.168.9.0)
    RTA_GATEWAY:     00 08 00 01 c0 a8 09 00
        RTA_LEN:     8
```

-continued

```
RTA_TYPE:         RTA_GATEWAY (5)
DATA:             c0 a8 03 12 (192.168.3.18)
RTA_OIF:          00 08 00 04 00 00 00 02
    RTA_LEN:      8
    RTA_TYPE:     RTA_OIF (4)
    DATA:         2 (interface index)
Command - routedel - net 192.168.3.141 netmask 00:11:22:33:44:55
Type:    RTM_DELROUTE
Netmask Length:   26
Family:  AF_INET
RTA_DST:          00 08 00 01 c0 a8 09 00
    RTA_LEN:      8
    RTA_TYPE:     RTA_DST (1)
    DATA:         c0 a8 09 00 (192.168.9.0)
RTA_GATEWAY:      00 08 00 01 c0 a8 09 00
    RTA_LEN:      8
    RTA_TYPE:     RTA_GATEWAY (5)
    DATA:         c0 a8 03 12 (192.168.3.18)
RTA_OIF:          00 08 00 04 00 00 00 02
    RTA_LEN:      8
    RTA_TYPE:     RTA_OIE (4)
    DATA:         2 (interface index)
```

Next, pseudo code is used to disclose the procedure for first building the LC-Trie and next-hop tables, and then searching the tables. The procedure for building the tables is generally straightforward. The first step comprises retrieving all of the current routing information from the systems routing tables. This information includes all of the IP addresses, any MAC address information from layer 2 tables, and the like. A next-hop entry is created for each route in the system, in no particular order. Again, if the entry is a network route, two next-hop entries are created one containing the IP address and the other containing the layer 2 address information.

The next-hop entries are then sorted by IP address and duplicate entries are removed. Duplicate next-hop entries can occur in the situation where one gateway server is the next-hop to multiple routes, the host information for the gateway only needs to be stored once in the next-hop table. Also, if the layer 2 information associated with a particular entry is already in the ARP cache, this can result in a duplicate information. An entry is considered a duplicate if the IP address and the mask length matches that of another entry. In the case of duplicate entries, the entry with valid layer 2 information is retained over one with invalid information.

The next step comprises sorting the entries by IP address in binary in the manner described in reference to the entries in Table 1. Any conventional sort method can be used including standard comparison based sorting algorithms like quick-sort, or a radix sorting algorithm can be used as well. Once the entries are sorted it is a simple task to identify base vectors, and prefix vectors of those base vectors. A prefix vector is an entry whose binary IP address has a prefix of bits at least as long as the mask length of the entry, entirely contained within another entries prefix of mask length bits. In addition, a prefix vector would comprise an internal node in the LC-Trie, while the base vector would comprise a terminal leaf node. For example, referring to Table 3, Entry 1 would be a prefix entry of the base vector stored in Entry 2. Of course, it is possible that Entry 2 could be a prefix vector of some other base vector entry. Because the table is sorted a prefix entry will immediately follow its base vector entry, and there might be a chain of such entries. These chains of prefix entries are linked together to allow for easily traversing a chain of entries starting from a base vector through each prefix entry from the largest mask length to the smallest mask length. The links in the chain are reflected in the Next-Hop Backup Offset field of the next-hop table. Again, this allows for moving back up the tree in those rare instance where the LC-Trie search moved too far down the tree.

The final step before actually building the LC-Trie search table comprises updating each network route entry in the next-hop table with a pointer to the entry in the next-hop table containing the layer 2 information for that IP address. Again, this reduces the complexity of updating MAC layer 2 information in the case where several entries use the same MAC address. By storing the MAC information in a single entry in the next-hop table, only that entry needs updating if the MAC information changes. Otherwise, the entry next-hop table would have to be searched linearly each time MAC information changed in order to find all effected entries.

In order to avoid conflicts during the build process with ongoing searches of the LC-Trie table, the LC-Trie is built initially in a separate memory area and then upon completion the LC-Trie is copied over the previous LC-Trie. The following, based on the work of Nilsson & Karlsson, shows the pseudo code for a recursive function for building an LC-Trie search table named LC-Trie from a table of IP address entries named Base.

```
Build (int first, int n, int pre, int pos)
{
if(n == 1)
  2{
  LC-Trie[pos] = { 0, 0, first};
  return;
  }
Skip = ComputeSkip(pre, first, n);
Branch = ComputeBranch (pre, first, n, skip);
Offset = AllocateMemory(2^Branch);
LC-Trie[pos]= {Branch, Skip, Offset};
p = first;
for bitpat = 0 to 2^Branch - 1
  {
  k = 0;
  while (Extract(pre + Skip, Branch, Base[p+k])== bitpat)
    k = k + 1;
  Build(p, k, pre + skip, Offset + bitpat);
  p = p + k;
  }
}
```

The LC-Trie table (LC-Trie) is built from the top down based on recursive processing of branches (or subintervals) of the entries in the table Base. The Build function is passed four integer parameters: first—the number of the first entry of the set of entries from the table Base being processed by the Build function; n—the number of entries set of entries being processed by the Build function; pre—the number of bits in any common prefix among the set of entries being processed by the Build function; and pos—the first available position in the table LC-Trie for assignment of an entry.

To illustrate the building of an LC-Trie search table, consider executing the Build function on the entries in Table 1 hereinabove. The initial call to the function would take the form "Build (0, 15, 0, 0)", where the first call includes all 15 entries in Table 1. The first if statement handles the case where the Build function is called with only one entry, in which case a lead node is created in the table LC-Trie. Thus, all leaf (or terminal) nodes are created be this if statement with a branch and skip value of zero. While Nilsson and Karlsson disclose a leaf node with a non-zero skip value, in practice with full IP address this does not occur.

If there is more than one entry, control passes to the next execution block for calculation of the value of Skip and Branch. The Skip value is calculated by a ComputeSkip function that examines the first and last entry in the subinterval for a common prefix of bits, the number of bits in any such prefix comprises the Skip value. In the initial call to the Build function there is no common prefix among the 15 entries in Table 1, therefore, the Skip value equals zero.

The Branch value is calculated by a ComputeBranch function that examines all of entries in the subinterval to determine the largest number of prefix bits, disregarding any common prefix, that contain all of the possible values of that number of bits. Using the first call to all of the entries in Table 1 for illustration, there is no common prefix to ignore. Thus, beginning with the first bit all values are present (0,1), examining the first two bits of the entries shows all possible values of the first 2 bits are present in the entries (00, 01, 10, 11). Continuing in this fashion, all values are present for the first 3 bits, but not the first 4 bits. Thus, the Branch value is 3.

The value of Offset is calculated by an AllocateMemory function. The result of the function (Offset) is an internal pointer to the next-hop entry in the search table LC-Trie associated with the current internal node. In other words, AllocateMemory returns the Pointer portion of the Pointer/Entry No. column of Table 2. Taking into account that Branch levels, and $2^{Branch}$ internal nodes have been removed between the current node and the next-hop internal node, the AllocateMemory function sets the value of Offset to reflect its new node position in the compressed LC-Trie. Next, the Branch, Skip, and Offset value are assigned to the current search table entry (LC-Trie[pos]). By way of illustration, the first time through the Build function, Offset will equal 1 (see Table 2, row 1) due to the removal of $2^3$ internal nodes. This reflects the fact that the internal node that is Node No. 7 in FIG. 6a (starting from 0) is now Node No. 1 in the compressed LC-Trie shown in FIG. 6c. This is a reduction in 8 ($2^3$) nodes. The assignment of the values of Branch, Skip, Offset to the current position in the search table sets this new path in the compressed LC-Trie from the root node to the first internal node.

The next code section comprises the recursive call that builds progressively smaller subintervals of the entries. The code sets a counter variable p equal to first, which preserves the value of the first entry prior to the recursive call. A for loop executes $2^{Branch}$ loops, one for each node removed. The loop sets a local counter variable k to zero, and then uses a while loop to count the number of entries with each possible common prefix, or set, of bits. The while loop uses an Extract function that returns an integer equivalent of a predetermined portion of an entry. The function call is of the form Extract(p, b, s), where the function returns the integer equivalent of b bits of the string s starting at position p. The Build function is then called of for each combination.

To illustrate the recursive code section using the example of a call to the Build function for all entries, the first time through this section p is set to 0. The for loop will increment from 0 to $2^3-1$, or 8 iterations (one for each of the 8 possible values of 3 bits). The counter K is set to 0, and the while loop is executed. The while loop will extract Branch number of bits (3 in this case), starting at position pre plus Skip (0 in this case), from the (p plus k)th entry (0 in this case), and then compare that value to bitpat (0 in this case). The first iteration of the while loop will extract the first three bits of Entry No. 0 (000) from Table 1, which equals bitpat. The counter k is incremented, and the loop repeats this time extracting the first 3 bits of Entry No. 1 (000), which also equals bitpat. The counter k is increments to the value of 2, and the while loop extracts the first 3 bits of Entry No. 2 (001), which does not equal bitpat. Then the Build function is called recursively for the set of entries that matched bitpat (in the case where the first entry is Entry No. 0, the call to build should be for k−1 entries, rather than k entries). Upon return from the recursive call, the value of the counter p is incremented by the value of k and the for loop continues. In this manner the LC-Trie is built one branch at a time.

The preferred implementation differs from the pseudo code implementation in that in order to accommodate the root branch factor, which is always present, the first entry in the LC-Trie search table is required to have a skip value of 0.

As mentioned the LC-Trie table is built to a separate memory area and then copied over the existing LC-Trie table. The copy proceeds one entry at a time from the bottom of the table to the top. This avoids the need for locking the table during copying. Thus, searches and copying can proceed at the same time. The search algorithm rarely moves backwards through the search table, accordingly, a search is likely to move between the old and new portions of the search table only once. While it is possible that this could result in a failed search and a dropped packet, this is a rare enough occurrence to justify the benefit resulting from avoid locking the table from searches during copying.

To add a new entry to the search table requires adding the entry to a free entry in the table and then rebuilding the table in the same manner described hereinabove. To delete an entry merely requires marking the deleted entry as a free entry, and then rebuilding the table. However, the sort step can be omitted due to the fact that removing an entry will not effect the order of the remaining entries.

The following pseudo code discloses the procedure for searching the LC-Trie compressed search table. In the preferred embodiment of the invention the routine (and the routines disclosed hereinbelow) is implemented in C code, and IXP 1200 microcode. Those of ordinary skill in the art will understand that the invention in not so limited, and can be implemented in other languages.

```
FTMQuery (ip)
{
if (hopent = Getent(ip))
    {
    if (hopent.flags & Flags_Net)
        {
        hopent = nexthop[hopent.pro_spec.nhop];
        }
    if (hopeent.flags & Flags_PSV)
        {
        return (hopent);
        }
    }
    return NULL;
}
Getent(ip)
{
node = LC-Trie[0];
Pos = node.skip;
Branch = node.branch;
Offset = node.offset;
while (Branch != 0)
    {
    node = LC-Trie[Offest + Extract(Pos, Branch, IP)];
    Pos = Pos + Branch + node.skip;
    Branch = node.branch;
    Offest = node.offset;
    }
hopent = nexthop[Offset];
bitmask = hopent.ipaddr^ip;
if (Extract(0, hopent.masklen, bitmask) == 0)
    {
    return hopent;
    }
```

```
Offset = hopent.nexthop;
While (Offset != NoPrefix)
  {
    hopent = next[Offset]];
    if (Extract(0, hopent.mask.len, bitmask) == 0)
      {
        return hopent;
      }
  }
return NULL;
}
```

The search begins by calling the FTMQuery core function, which attempts to find a match for the IP Address ip. The FTMQuery function calls the Getent function, which actually handles the search. The Getent function, if successful, returns the entry in the next-hop table that matches the address ip in the variable hopent. If Getent is not successful it returns the value of NULL in the variable hopent. Thus, if the Getent function returns an ip address control passes into the if statement in FTMQuery. At this point FTMQuery needs to check two situations. First, Getent checks the Flags field in the next-hop table to determine if the ip address is a network entry. If so, one more hop is made into the next-hop table to get the layer 2 information. The first if statement handles this situation. The second situation comprises checking the Flags field in the next-hop table to determine if the ip address in hopent is valid. If it is valid FTMQuery successfully returns hopent, otherwise, a NULL value is returned.

Again, the Getent function actually searches the table LC-Trie for a match to the IP address ip. First, the function loads the root node information, setting the values of Pos (or Skip), Branch, and Offset associated with the first entry in the table. Next, Getent executes a while loop that searches the table LC-Trie until it reaches a terminal leaf node, i.e. a node where Branch equals 0. To illustrate using the values in Table 2, suppose the Getent is called to search for the ip address 10111. The root node information is loaded, setting Pos=0, Branch=3, and Offset=1. The function extracts the first three bits of the ip address 10111, or 101, which is 5 in decimal equivalent. Adding the value of Offset (Pointer/Entry No. in Table 2) to this number results in 6 (5+1), which identifies the next entry (Node No. 6) in Table 2 to read into node. Pos is then incremented to the value of Pos + Branch + the current value of node.skip. This assigns Pos the value 3 (0+3+0), this mean that Pos numbers of bits can be now be ignored by Getent. The values of Branch and Offset are set to 2 and 0 respectively (the values of Node No. 6 in Table 2). The while loop executes again due to the fact that Branch does not equal 0. Extract pulls out the remainder of the next, and last, two bits in ip (11) and returns the decimal equivalent of 3, which is then added to the value of Offset in Node No. 6 of Table 2. Thus, node is assigned the value of 3+13=16. Node No 16 has a Branch value of 0, which terminates the search loop. At this point the Getent function has identified an identical match in that the pseudo address of Node No. 16 matches address ip exactly. However, in practice Getent needs to further examine the match to determine if it found the best match.

The code block in Getent following the while loop determines if the match between ip and hopent is exact to the mask length number of bits in hopent. This is accomplish by performing an exclusive or operation on the two strings, and then comparing the result in the if statement. If the mask length number of bits match then Getent has found a match and it returns hopent (the next-hop offset).

The following code block deals with the case where there is not a match, or not a significant match, and Getent looks back up the tree for a match. The block begins by setting Offset to the first entry back up the tree from hopent. A while loop is executed, as long as Offset is a valid number, which repeats the comparison of the previous code block. If a match is found Getent returns hopent, otherwise it keeps trying. If a match is not found Getent returns NULL.

The foregoing discloses the mechanics of the FTM application running on the microengines, the format of the associated tables, and the manner the tables are built and searched. The FTM application, however, cannot function in isolation. The structure of the network processor requires a means for the core processor to interface with the microengines. For example, if the FTM application cannot process a data packet it passes the packet to the core, or as in the preferred embodiment of the invention the portion of the FTM application that builds and maintains the tables operates on the core processor, while the searching portion of the application operates on the microengines. In either event, an interface is required to provide for communication between the aforementioned computing elements.

This following describes the preferred embodiment of the interface presented by the IXP 1200 microcode to the StrongARM core. This interface provides the framework necessary to write an Ethernet and/or ATM driver for any operating system running on the core. Of course, the invention is not so limited, the invention and the interface can utilize any conventional or similar network. The FTM application provides for the bulk of the standard communication along the data plane, however, there are instances where communication needs to take place between the core and the microengines. This communication includes primarily control and management plane communication, along with setup and initialization information and data plane communication that the FTM application passes to the core processor.

The core driver has two initialization responsibilities. The first is to make sure the hardware has been correctly initialized. The second is to provide the required configuration parameters to the microengines. This configuration information is provided to the microengines via a CSR (configuration and status register) block. Appendix A contains a 'C' language structure that describes the interfaces CSR.

After initialization of the interfaces, the core is responsible only for management of the high level buffer descriptors. All MAC and physical layer processing is handled by the microengines through the FTM application.

The core processor and microengines use buffer descriptors to exchange the location of transmitted/received data as well as any required control information. The Ethernet and ATM drivers each allocate and maintain their own set of buffer descriptors. These buffer descriptor pools are further divided into separate transmit buffer descriptor and receive buffer descriptor pools. Thus there are four distinct groups: Ethernet receive; Ethernet transmit; ATM receive; and ATM transmit. While these four pools are maintained separately, they all use the same basic data structure format. The only difference is that the status field bits are defined differently for each group. The general format of the buffer descriptors is as follows:

| | | |
|---|---|---|
| Offset 0 | Next Buffer Descriptor | |
| Offset 4 | Control/Status | Port Number |
| Offset 8 | Data Length | Reserved |
| Offset 12 | Data Size | Reserved |
| Offset 16 | Data Location | |
| Offset 20 | User Data | |
| Offset 24 | Reserved | |
| Offset 28 | | |

Each buffer descriptor refers to a single complete packet. At a minimum there must be at least one transmit and one receive buffer descriptor for each driver although in any practical application more are required. The number required depends on how many ports will be active and the expected packet rates. Performance will be impacted if either the core driver or the microengines are unable to get a free buffer descriptor. The maximum number of descriptors is limited only by the amount of available memory. It is strongly recommended that all buffer descriptors either be located in non-cached memory, or no more than one occupy a single cache line.

The memory location of the various buffer descriptor queues is configured via the CSR. There are two basic types of linked list queues. The first type makes use of the IXP push/pull queues. Three of the available eight push/pull queues are required for either the Ethernet or ATM interfaces. These queues hold the lists of free transmit and receive buffer descriptors, in addition to a list of transmitted buffer descriptors waiting final core processing. No locking is required when inserting onto or removing from these queues as the hardware provides this feature. The second type of queue is used for the transmit and receive queues. These must maintain a FIFO ordering so the push/pull queues are not appropriate. To provide fast insertions and deletions a head and tail pointer are maintained for each of these queues. In order to maintain consistency the CAM (conditional access module) locking mechanism must be used to acquire a lock on the tail pointer before accessing these queues from the core driver.

Each descriptor contains a user-defined field that the microengines never modify. This field may be used for anything the core driver wishes. For example, the data pointer may point into a data area that is contained inside some other structure such as an mbuf. After packet transmission the driver may need to return this encompassing structure to the system. The user data field provides a convenient place to store a pointer to this structure.

The following describes the format of the receive buffer descriptors, which take the general form disclosed hereinabove. The core driver is responsible for allocating and initializing receive buffer descriptors, the components of which are described hereinbelow.

The next buffer descriptor field allows for creating chains of descriptors for processing by the core by identifying the next buffer descriptor in the chain for processing.

The control/status word field contains information relating to certain errors associated with, and relating to certain characteristics of, the actual data that the buffer descriptors describe. The structure of the word varies depending on whether the information is received/transmitted on an Ethernet or ATM network.

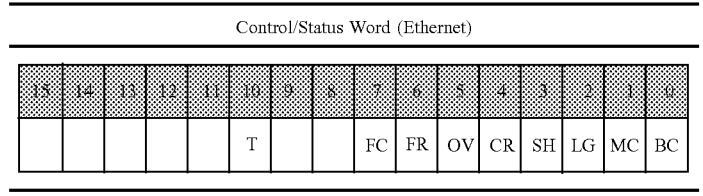

The control/status word occupies 16 bits, and all of the reserved bits should be initialized to zero.

Bits 15 through 11—Reserved.

Bit 10—This bit contains the type bit indicating whether this is a receive or transmit buffer descriptor. For receive buffer descriptors the driver should set the bit to 0.

Bits 9 through 8—Reserved.

Bit 7—This bit is the flow control packet bit, which indicates that the received packet is a flow control packet.

Bit 6—This bit is the framing error bit, which indicates the packet was received with a framing error.

Bit 5—This bit is the receiver overrun bit, which indicates that the microcode was unable to remove data from the hardware receive FIFO before it overflowed. This indicates either the microcode is not fast enough to keep up, or the system ran out of free receive buffer descriptors.

Bit 4—This bit is the CRC (cyclic redundancy code) error bit, which indicates the packet was received, but the CRC was incorrect.

Bit 3—This is the short packet bit, which indicates a packet smaller than 64 bytes was received.

Bit 2—This is the long packet bit, which indicates a packet longer than the maximum was received.

Bit 1—This is the multicast bit, which indicates the packet was received as a hardware layer multicast.

Bit 0—This is the broadcast bit, which indicates the packet was received as a hardware layer broadcast.

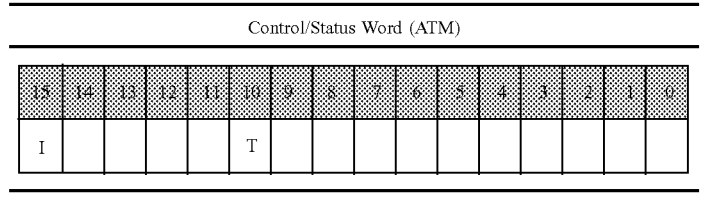

Bit 15—This is the interrupt bit, wherein setting this bit will cause the microengines to send an interrupt to the core after filling this buffer descriptor with data and placing it on the rxbd queue.

Bit 14 through 11—Reserved.

Bit 10—This is the type bit, which indicates whether this is a receive or transmit buffer descriptor. For receive buffer descriptors this should be set to 0.

Bit 9 through 0—Reserved.

For receive buffer descriptors the port number field will be set by the microcode to indicate on which interface the packet was received.

| Port Number |
|---|

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| — | IX | \multicolumn{4}{c}{Type} | \multicolumn{4}{c}{Reserved} | \multicolumn{3}{c}{MAC Number} | \multicolumn{3}{c}{Unit Number} |

Bit 15—Reserved.

Bit 14—This is the IX bit, which indicates that the port is located on the IX bus. For both Ethernet and ATM this will be set to 1 by the microcode.

Bit 13 through 10—This is the type bit field, which indicates the type of interface: 1—Ethernet; 2—ATM; and 3 through 15—Reserved.

Bits 9 through 6—Reserved.

Bits 5 through 3—These bits indicate the MAC number of the port.

Bits 2 through 0—These bits indicate the Unit number of the port.

The data length field should be initialized to 0 before being placed on the rxfree queue. Before the microengines enqueue the buffer descriptor on the rxbd queue, they will set the data length field to reflect the total number of bytes copied into the buffer. This will include both the data link header and payload. In the case of ATM, only the ATM header on the first cell is copied, and subsequent ATM headers for the same packet are discarded. The data size field indicates the maximum number of data bytes the microengines can copy into the buffer associated with this buffer descriptor. For both Ethernet and ATM it must be large enough to contain an entire frame. This means it should be at least 1552 for ATM and 1514 for Ethernet.

The data location field contains a pointer to the beginning of the buffer associated with the buffer descriptor that contains the actual transmitted/received data. For receive buffer descriptors this must be on an 8 byte boundary. The ATM microcode also requires the 8 bytes immediately preceding this location to the available to store temporary data.

The user data field may be used to store any data needed by the driver. This field is never looked at or modified by the microengines. For example, if the data location pointer points inside of a larger data structure this field could be used to easily find the encompassing data structure.

The following describes the transmit buffer descriptors, again of the general form disclosed hereinabove. When the core wishes to transmit a packet, the driver removes a buffer descriptor from the txfree queue, fills in all the required transmit fields, and enqueues it on the txbd queue. The core driver does not need to wait for the packet to be sent, but instead can immediately use the next transmit buffer descriptor. This may continue until either the core processor runs out of packets to transmit, or the txfree queue is empty. Once the core processor enqueues the packet, it is not allowed to change any fields in the transmit buffer descriptor. After each packet has been sent, the microengines enqueue the buffer descriptor on the txdone queue and interrupt the core if requested. The driver then removes buffer descriptors from this queue, frees any associated system memory and places the buffer descriptor back in the txfree queue.

The following describes the format of the transmit buffer descriptors.

The next buffer descriptor field allows for creating chains of descriptors for processing by the core by identifying the next buffer descriptor in the chain for processing.

The Control/Status Word contains information to identify certain information related to interrupts and types.

| Control/Status Word (Ethernet) |
|---|

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| I |  |  |  |  | T |  |  |  |  |  |  |  |  |  |  |

Bit 15—This is the interrupt bit, which when set will cause the microengines to send an interrupt to the core after transmitting the data and placing the buffer descriptor on the txdone queue.

Bit 14 through 11—Reserved.

Bit 10—This is the type bit, which indicates whether this is a receive or transmit buffer descriptor. For transmit buffer descriptors this should be set to 1.

Bits 9 through 0—Reserved.

| Control/Status Word (ATM) | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| I | | | | | T | | | | | | | | | | |

Bit 15—This is the interrupt bit, which when set will cause the microengines to send an interrupt to the core after transmitting the data and placing the buffer descriptor on the txdone queue.

Bit 14 to 11—Reserved.

Bit 10—This is the type bit, which indicates whether this is a receive or transmit buffer descriptor. For transmit buffer descriptors this should be set to 1.

Bit 9 to 0—Reserved.

The port number field is used to indicate on which port the packet will be sent.

The following describes the configuration of the CSR block provided to the microengines upon initialization. The C code of the CRS for the Ethernet and ATM interfaces is set forth in Appendix A. The CRS for Ethernet and ATM are divided into two sections and contain configurable parameters to control microengine operation. The first is a single common section that is shared by all interfaces of that type, and a second section that contains port specific information.

The common Ethernet CSR section contains a single copy of various queuing data structures that are shared by all Ethernet ports, which are set forth below.

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| — | IX | Type | | | | Reserved | | | | MAC Number | | | Unit Number | | |

Bit 15—Reserved

Bit 14—This is the IX bit, which indicates the port is located on the IX bus. For both Ethernet and ATM this should be set to 1.

Bit 13 through 10—This is the type bit field, which indicates the type of interface: 1—Ethernet; 2—ATM; and 3 through 15—Reserved.

Bits 9 through—Reserved.

Bits 5 through 3—These bits indicate the MAC number of the port.

Bits 2 through 0—These bits indicate the Unit Number of the port.

The data length field indicates the number of data bytes in the buffer associated with this descriptor that should be transmitted.

The data size field is not used by transmit buffer descriptors, and should be initialized to zero.

The data location field points to the beginning of a buffer containing the packet to be transmitted. The packet must already contain the Ethernet or ATM data link header. In the case of ATM only the header for the first cell is included. There are no alignment restrictions on the data location pointer for Ethernet. For ATM the data location must be 8 byte aligned.

The user data field may be used to store any data needed by the driver. This field is never looked at or modified by the microengines. For example, if the data location pointer points inside of a larger data structure this field could be used to easily find the encompassing data structure.

rxfree_push—A pointer to one of the eight IXP push queues. When the core is finished processing a received buffer descriptor, the driver should return it to the rxfree list using this push queue.

rxfree_pull—A pointer to one of the eight IXP push queues. When the microengines need a receive buffer descriptor they can get one from here. This parameter must be associated with the same push/pull queue as rxfree_push.

txfree_push—Similar to rxfree_push. The core driver should enqueue transmit buffer descriptors here after processing them from the txdone_pull queue.

txfree_pull—Similar to rxfree_pull. When the core driver needs a free transmit buffer descriptor it can get one from this queue.

txdone_push—A pointer to an IXP push queue that stores transmitted buffer descriptors. After the microengines are finished with a transmit buffer descriptor it will be enqueued here.

txdone_pull—The core driver can retrieve transmitted buffer descriptors from this IXP pull queue. This allows the driver to free any memory associated with a buffer descriptor before it is enqueued on the txfree_push queue.

rxbd_tail—A pointer to the tail of the receive queue. The microengines will enqueue any incoming packets here.

rxbd_head—A pointer to the head of the receive queue. The core driver will receive incoming packets from here.

txbd_tail—A pointer to the tail of the transmit queue. The core driver should enqueue all transmit buffer descriptors here.

txbd_head—A pointer to the head of the transmit queue. The microengines will remove buffer descriptors that are ready to be transmitted from here.

Also included in the common Ethernet CSR section is the interrupt vector (vector) used by all Ethernet ports. It is the responsibility of the core driver to demultiplex the incoming packets if required.

The common Ethernet CSR section also includes an interrupt event/mask register (i_event/i_mask). The event register and mask register are physically different registers but contain the same bit field definitions. The event register will indicate which of the various interrupts are pending. However, an actual interrupt to the core only occurs if the equivalent bit in the mask register is set.

the command. Bit 16 represents port 0 and bit 31 represents port 15. It is possible for a single command to be applied to multiple ports by setting more than one bit in this field.

Bit 15—This is the busy flag bit and indicates that the microengines are currently executing a command. The driver sets this bit after initializing the appropriate parameters and then waits for the bit to be cleared, indicating the command has finished.

Bits 3 through 0—This is the opcode field, which specifies what command is to be executed by the microengines on the indicated port(s).

0000—Start transmitter and receiver, it is possible to start both the transmitter and receiver for a port at the same

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Field | TXB | | | | | | | | | | | | | | | |
| | 15 | 14 | 13 | 12 | 11 | 10 | 9 | 8 | 7 | 6 | 5 | 4 | 3 | 2 | 1 | 0 |
| Field | | RXE | RXF | | | | | | | | | | | | | |

Bit 31—This is the transmit buffer interrupt bit. This interrupt is generated by the microengines after a buffer has been transmitted and the associated buffer descriptor placed on the txdone queue.

Bit 30 through 15—Reserved.

Bit 14—This is the receive error interrupt bit. If an error occurs during the reception of a packet the receive error interrupt is generated. The buffer descriptor is still enqueued on the rxbd queue and the bd_status field indicates the cause of the error.

Bit 13—This is the receive frame interrupt bit. After a frame has been successfully received, it is placed in the rxbd queue and the receive frame interrupt is generated.

Bit 1 through 0—Reserved.

The last component of the common Ethernet CSR section comprises the microengine command register (mccr) used to send commands to the microengines.

time. This is equivalent to a start receiver followed by a start transmitter command.

0001—Start receiver

0010—Start transmitter

0011—Stop receiver

0100—Stop transmitter

The following describe the port specific Ethernet CSR section. The first component configures the physical address (paddr) of each Ethernet port with a 48 bit 802.3 MAC layer address.

The last component configures the transmitter and receiver control register (trcr).

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Field | | | | | | | | Port | | | | | | | | |
| | 15 | 14 | 13 | 12 | 11 | 10 | 9 | 8 | 7 | 6 | 5 | 4 | 3 | 2 | 1 | 0 |
| Field | BF | | | | | | | | | | | | Opcode | | | |

Bits 31 through 16—These bits comprises the port bit field used to specify which Ethernet ports on which to apply

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Field | | | | | | | | | | | | | | | | |
| | 15 | 14 | 13 | 12 | 11 | 10 | 9 | 8 | 7 | 6 | 5 | 4 | 3 | 2 | 1 | 0 |
| Field | | | | | | | | | | | | | | | | TE | RE |

Bit 31 through 2—Reserved.
Bit 1—This bit enables the transmitter.
Bit 0—This bit enables the receiver.

The following describes the structure of the CRS for the ATM network and is also divided into two sections. The first section is a single common section that is shared by all interfaces of that type, and a second section that contains port specific information.

The common ATM CSR section contains a single copy of various data structures that are shared by all ATM ports, which are identical to the queuing structures used for the Ethernet ports as set forth hereinabove.

Also included in the common ATM CSR is the interrupt vector (vector) used by all ATM ports. It is the responsibility of the core driver to demultiplex the incoming packets if required.

Interrupt Event/Mask Register (i_event/i_mask). The event register and mask register are physically different registers but contain the same bit field definitions. The event register will indicate which of the various interrupts are pending. However, an actual interrupt to the core only occurs if the equivalent bit in the mask register is set.

Bits 31 through 16—These bits comprise the port bit field to specifying which ATM ports on which to apply the command. Bit 16 represents port 0 and bit 31 represents port 15. It is possible for a single command to be applied to multiple ports by setting more than one bit in this field.

Bit 15—This is the busy flag bit and indicates that the microengines are currently executing a command. The driver sets this bit after initializing the appropriate parameters and then waits for the bit to be cleared, indicating the command has finished.

Bits 3 through 0—This is the opcode field, which specifies what command is to be executed on the indicated port(s).
- 0000—Start transmitter and receiver, it is possible to start both the transmitter and receiver for a port at the same time. This is equivalent to a start receiver followed by a start transmitter command.
- 0001—Start receiver
- 0010—Start transmitter
- 0011—Stop receiver
- 0100—Stop transmitter Port Specific ATM CSR The following describe the port specific ATM CSR section, which consists of a bit field that configures the transmitter and receiver control register (trcr).

| Field | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| | TXB | | | | | | | | | | | | | | | |
| Field | 15 | 14 | 13 | 12 | 11 | 10 | 9 | 8 | 7 | 6 | 5 | 4 | 3 | 2 | 1 | 0 |
| | | RXE | RXF | | | | | | | | | | | | | |

Bit 31—This is the transmit buffer bit. This interrupt is generated by the microengines after a buffer has been transmitted and the associated buffer descriptor placed on the txdone queue.

Bit 30 through 15—Reserved.

Bit 14—This is the receive error interrupt bit. If an error occurs during the reception of a packet the receive error interrupt is generated. The buffer descriptor is still enqueued on the rxbd queue and the bd_status field indicates the cause of the error.

Bit 13—This is the receive frame interrupt bit. After a frame has been successfully received, it is placed in the rxbd queue and the receive frame interrupt is generated.

Bit 1 through 0—Reserved.

The last component of the common ATM CSR section comprises the microengine command Register (mccr) used to send commands to the microengines.

| Field | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| | Port | | | | | | | | | | | | | | | |
| Field | 15 | 14 | 13 | 12 | 11 | 10 | 9 | 8 | 7 | 6 | 5 | 4 | 3 | 2 | 1 | 0 |
| | BF | | | | | | | | | | | | Opcode | | | |

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| Field | | | | | | | | | | | | | | | |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|----|----|
| Field | | | | | | | | | | | | | | TE | RE |

Bit 31 through 2—Reserved

Bit 1—This bit enables the transmitter.

Bit 0—This bit enables the receiver.

The following section comprises a functional description of the steps required in initialization and resetting the microengines as well as transmission and reception of packets.

Initialization steps: (1) disable transmit and receive; (2) configure CSRs (speed, duplex, BD's, address information, and the like); (3) clear event register; (4) set mask register; (5) enable interrupts; and (6) start transmit and receive.

Transmit steps: (1) fill in descriptor; (2) put on transmit queue; and (3) and process TX interrupt.

Receive steps: (1) when a packet arrives at an interface the microengines remove a buffer descriptor from the receive free list and begin filling it with data, after the packet reception has completed, the status information is updated and the buffer descriptor is placed in the rxbd queue, if requested, an interrupt to the core is also generated, if the core driver does not process packets fast enough and the microengines run out of available receive descriptors, all incoming packets are simply dropped until descriptors become available; (2) save information from descriptor; (3) reset descriptor values; and (4) put on rxfree queue;

Reset steps: (1) stop transmitter and receiver; (2) change configuration parameters; and (3) issue reset command.

With regard to hardware initialization, the driver is responsible for some of the Ethernet and ATM hardware initialization. With Ethernet, preferably Intel IXF440 Ethernet, the core driver is responsible for configuring the following registers on the Intel IXF440 multiport 10/100 Mbps Ethernet controller.

ixf_pcr—Port control register ixf_fbr—FIFO bus mode register ixf_rpr—Receive parameter register ixf_smr—Serial mode register ixf_ftr—FIFO threshold register ixf_rmfr—Receive mode filtering register ixf_ier—Interrupt enable register

Appendix A—Data Structures

This appendix contains the 'C' language definitions for the data structures referenced hereinabove.

```
/*
** Buffer Descriptors
*/ typedef struct BufferDescriptor {
    struct BufferDescriptor *bd_next;
    u_int16 bd_status;
    u_int16 bd_port;
    u_int16 bd_len1;
    u_int16 bd_len2;
    u_int16 bd_size1;
    u_int16 bd_size2;
    u_int8 *bd_data1;
    u_int32 bd_usr1;
    u_int8 *bd_data2;
    u_int32 bd_usr2;
} BD;

/*Ethernet interfaces */ typedef struct {
    /* Ethernet Port Specific Data */
    u_int8 paddr[6]; /* Unicast address */
    u_int8 res1 [2];/* Padding for alignment */
    u_int32 res2[2]; /* Reserved */
    u_int32 trcr; /* Transmit/Receive Control Register */
}Enet_port;

typedef struct {
    /* Ethernet Common Data */
    BD *free_push; /* IXP Push Queue for Empty BD's */
    BD *free_pull; /* IXP Pull Queue for Empty BD's */
    BD *txdone_push; /* IXP Push Queue for Transmitted BD's */
    BD *txdone_pull; /* IXP Pull Queue for Transmitted BD's */
    BD *rxbd_tail; /* Tail of receive queue */
    BD *rxbd_head; /* Head of receive queue */
    BD *txbd_tail; /* Tail of transmit queue */
    BD *txbd_head; /* Head of transmit queue */
    u_int32 vector /* Interrupt Vector */
    u_int32 i_event; /* Interrupt Event Register */
    u_int32 i_mask; /* Interrupt Mask Register */
    u_int32 mccr; /* Microcode Command Register */
} Enet_common;

/* ATM Interfaces */ typedef struct {
    /* ATM Port Specific Data */
    u_int32 trcr; /*Transmit/Control Register */
} ATM_port;

typedef struct {
    /* ATM Common Data */
    BD *free_push; /* IXP Push Queue for Empty BD's */
    BD *free_pull; /* IXP Pull Queue for Empty BD's */
    BD *txdone_push; /* IXP Push Queue for Transmitted BD's */
    BD *txdone_pull; /* IXP Pull Queue for Transmitted BD's */
    BD *rxbd_tail; /* Tail of receive queue */
    BD *rxbd_head; /* Head of receive queue */
    BD *txbd_tail; /* Tail of transmit queue */
    BD *txbd_head; /* Head of transmit queue */
    u_int32 vector; /* Interrupt Vector */
    u_int32 i_event; /* Interrupt Event Register */
    u_int32 i_mask; /* Interrupt Mask Register */
    u_int32 mccr; /* Microcode Command Register */
```

} ATM_common;
/*
** IXP 1200 Shared memory map
*/
typedef struct {
  Enet_common enet_common;
  Enet_port enet_port[MAX_ENET_PORTS];
  ATM_common atm_common;
  ATM_Port atm_ort[MAX_ATM_PORTS];

} IXP1200MM;

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

The invention claimed is:

1. An interface for enabling communication between a primary and a secondary computing elements of a multiple element computer system, comprising:
   a multiple element computing system having a primary computing element and a secondary computing element;
   a configuration and status register (CSR) block having a common section and a port specific section for enabling the exchange of buffer descriptors between said primary and said secondary computing elements wherein said buffer descriptors contain information identifying underlying information packets to be processed on said computer system;
   wherein said buffer descriptors further comprise receive buffer descriptors sent from said secondary computing element to said primary computing element, and transmit buffer descriptors sent from said primary computing element to said secondary computing element;
   wherein said common section of said CSR block further comprises a queuing structure that said primary and said secondary computing elements use to receive and transmit said buffer descriptors;
   wherein said queuing structure further comprises a receive free pull queue wherein said secondary computing element can obtain an available receive buffer descriptor;
   a receive queue having a head and a tail pointer, wherein said secondary computing element can return receive buffer descriptors to said tail of said receive queue after filling said receive buffer descriptors with data, and wherein said primary computing element can remove filled receive buffer descriptors from said head of said receive queue;
   a receive free push queue wherein said primary computing element can return buffer descriptors after said primary computing element has finished processing said receive buffer descriptors;
   a transmit free pull queue wherein said primary computing element can obtain an available transmit buffer descriptor;
   a transmit queue having a head and a tail pointer, wherein said primary computing element can return transmit buffer descriptors to said tail of said transmit queue after filling said transmit buffer descriptors with data, and wherein said secondary computing element can remove filled transmit buffer descriptors from said head of said transmit queue;
   a transmit done push queue wherein said secondary computing element can return transmit buffer descriptors after said secondary computing element has finished processing transmit buffer descriptors;
   a transmit done pull queue wherein said primary computing element can retrieve transmit buffer descriptors; and
   a transmit free push queue wherein primary computing element can return transmit buffer descriptors.

2. The invention in accordance with claim 1 wherein said common section of said CSR block further comprises an interrupt vector for communicating interrupts to said primary computing element.

3. The invention in accordance with claim 2 wherein said common section of said CSR block further comprises interrupt event and mask registers, wherein said interrupt event register will identify pending interrupts and said mask register will determine if said identified interrupts are sent to said primary computing element.

4. The invention in accordance with claim 1 wherein said common section of said CSR block further comprises a secondary computing element command register for sending commands to said secondary computing element.

5. The invention in accordance with claim 1 wherein said port specific section of said CSR block is Ethernet specific and comprises a physical address component and a transmitter and receiver control register to enable transmitting or receiving.

6. The invention in accordance with claim 1 wherein said port specific section of said CSR block is ATM specific and comprises a physical address component and a transmitter and receiver control register to enable transmitting or receiving.

7. An interface for enabling communication between a primary and a secondary computing elements of a multiple element computer system, comprising:
   a multiple element computing system having a primary computing element and a secondary computing element:
   a configuration and status register (CSR) block having a common section and a port specific section for enabling the exchange of buffer descriptors between said primary and said secondary computing elements, wherein said buffer descriptors contain information identifying underlying information packets to be processed on said computer system;
   wherein said buffer descriptors further comprise receive buffer descriptors sent from said secondary computing element to said primary computing element, and transmit buffer descriptors sent from said primary computing element to said secondary computing element;
   wherein said receive bluffer descriptors comprise a next buffer descriptor field for storing a pointer to a next buffer descriptor in a chain of buffer descriptors;
   a control/status field comprising information for distinguishing between receive and transmit buffer descriptors, and if said receive buffer descriptor is Ethernet specific comprising information about said underlying information packets, or if said receive buffer descriptor is ATM specific an interrupt bit causing said secondary computing element to send an interrupt to said primary computing element;
   a port number field comprising network and interface specific information;

a data length field comprising the number of bytes containing said underlying information packet read into a buffer;

a data size field comprising the maximum number of bytes that can be read into said buffer;

a data location field comprising a pointer to the beginning of said buffer; and a user defined data field that is not modified by said secondary computing element.

8. An interface for enabling communication between a primary and a secondary computing elements of a multiple element computer system, comprising:

a multiple element computing system having a primary computing element and a secondary computing element;

a configuration and status register (CSR) block having a common section and a port specific section for enabling the exchange of buffer descriptors between said primary and said secondary computing elements, wherein said buffer descriptors contain information identifying underlying information packets to be processed on said computer system:

wherein said buffer descriptors further comprise receive buffer descriptors sent from said secondary computing element to said primary computing element, and transmit buffer descriptors sent from said primary computing element to said secondary computing element;

wherein said transmit buffer descriptors comprise:

a next buffer descriptor field for storing a pointer to a next buffer descriptor in a chain of buffer descriptors;

a control/status field comprising information for distinguishing between receive and transmit buffer descriptors, and an interrupt bit causing the secondary computing element to send an interrupt to said primary computing element;

a port number field comprising network and interface specific information;

a data length field comprising the number of bytes containing said underlying information packet read into a buffer;

a data location field comprising a pointer to the beginning of said buffer; and a user defined data field that is not modified by said secondary computing element.

9. An interface for enabling communication between a primary and a secondary computing elements of a multiple element computer system comprising:

computing system having a primary computing element comprising a core processor and a secondary computing element comprising a microengine;

a forwarding table manager application running on said primary and said secondary computing elements wherein said forwarding table manager:

builds a table comprised of a plurality of entries with addresses associated therewith wherein said entries are organized hierarchically according to an LC-Trie compression algorithm operating on said addresses;

receives an information packet within said computer system wherein said information packet has a destination address associated therewith;

searches said table using an LC-Trie search algorithm to find a match between said address of an entry in said table and said destination address of said information packet; and transmits said information packet to a forwarding address associated with said address of said matching entry.

10. The invention in accordance with claim 9 wherein said table comprises an LC-Trie search table and a next-hop table associated together, wherein said LC-Trie search table comprises information from said LC-Trie compression algorithm, and wherein said next-hop table comprises information necessary to transmit said information packet to said forwarding address associated with said matching entry.

11. The invention in accordance with claim 10 wherein said LC-Trie search table entries comprise a branching factor, a skip value, and an LC-Trie/Next-Hop Offset generated for each of said plurality of entries by said LC-Trie compression algorithm when said LC-Trie search table was built.

12. The invention in accordance with claim 11 wherein said next-hop table entries comprise an address field containing said address of said matching entry identified in said searching step, and an opaque data field for storing specialized packet processing information.

13. The invention in accordance with claim 12 wherein said next-hop table entries further comprise a mask length field containing a mask length of said entry, and said forwarding table manager application verifies that said address of said matching entry and said destination address of said information packet match to at least said mask length.

14. The invention in accordance with claim 13 wherein said next-hop table entries further comprise a next-hop backup offset field that references a previous entry in the hierarchy created in the building step, and said forwarding table manager application performs a second verification performed if said first verification fails, which verifies that said address of said previous entry and said destination address of said information packet match to at least a mask length number of bits of said previous entry.

15. The invention in accordance with claim 14 wherein said next-hop table entries further comprise a flag field wherein if said flag is set said port specific field contains an offset to an entry in said next hop table containing said forwarding IP address indicating said forwarding IP address addresses a network route, and if the flag is not set said port specific field contains said forwarding IP address indicating said forwarding IP address addresses a host route.

16. The invention in accordance with claim 12 wherein said opaque data field further comprises MPLS tags.

17. The invention in accordance with claim 12 wherein said opaque data field further comprises quality of service parameters.

18. The invention in accordance with claim 12 wherein said opaque data field further comprises encryption handling parameters.

19. The invention in accordance with claim 12 wherein said addresses comprise IP addresses, and said opaque data field further comprises VLAN tags.

20. The invention in accordance with claim 12 wherein said opaque data field further comprises a port specific field for accessing said forwarding address identified in said transmitting step.

21. The invention in accordance with claim 20 wherein said addresses are IP addresses.

22. The invention in accordance with claim 9 wherein said forwarding table manager application builds said table utilizing said core processor, and said search of said table is performed by said forwarding table manager application utilizing said microengine.

23. An interface for enabling communication between a core processor and at least one microengine of a network processor, comprising:

a network processor having a core processor and at least one microengine;

a configuration and status register (CSR) block having a common section and a port specific section for enabling the exchange of buffer descriptors between said core processor and said microengine, wherein said buffer descriptors contain information identifying underlying information packets;

wherein said buffer descriptors further comprise receive buffer descriptors sent from said microengine to said core processor, and transmit buffer descriptors sent from said core processor to said microengine;

wherein said common section of said CSR block further comprises:
- a queuing structure that said core processor and said microengine use to receive and transmit said buffer descriptors, comprising:
  - a receive free pull queue wherein said microengine can obtain an available receive buffer descriptor;
  - a receive queue having a head and a tail pointer, wherein said microengine can return receive buffer descriptors to said tail of said receive queue after filling said receive buffer descriptors with data, and wherein said core processor can remove filled receive buffer descriptors from said head of said receive queue;
  - a receive free push queue wherein said core processor can return buffer descriptors after said core processor has finished processing said receive buffer descriptors;
  - a transmit free pull queue wherein said core processor can obtain an available transmit buffer descriptor;
  - a transmit queue having a head and a tail pointer, wherein said core processor can return transmit buffer descriptors to said tail of said transmit queue after filling said transmit buffer descriptors with data, and wherein said microengine can remove filled transmit buffer descriptors from said head of said transmit queue;
  - a transmit done push queue wherein said microengine can return transmit buffer descriptors after said microengine has finished processing transmit buffer descriptors;
  - a transmit done pull queue wherein said core processor can retrieve transmit buffer descriptors; and
  - a transmit free push queue wherein core processor can return transmit buffer descriptors;
- an interrupt vector for communicating interrupts to said core processor;
- interrupt event and mask registers, wherein said interrupt event register will identify pending interrupts and said mask register will determine if said identified interrupts are sent to said core processor;
- a microengine command register for sending commands to said microengine;

wherein said port specific section of said CSR block comprises an Ethernet specific component comprising a physical address component and a transmitter and receiver control register to enable transmitting or receiving, and comprises an ATM specific component comprising a physical address component and a transmitter and receiver control register to enable transmitting or receiving;

wherein said receive buffer descriptors comprise:
- a next buffer descriptor field for storing a pointer to a next buffer descriptor in a chain of buffer descriptors;
- a control/status field comprising information for distinguishing between receive and transmit buffer descriptors, and if said receive buffer descriptor is Ethernet specific comprising information about said underlying information packets, or if said receive buffer descriptor is ATM specific an interrupt bit causing said microengine to send an interrupt to said core processor;
- a port number field comprising network and interface specific information;
- a data length field comprising the number of bytes containing said underlying information packet read into a buffer;
- a data size field comprising the maximum number of bytes that can be read into said buffer;
- a data location field comprising a pointer to the beginning of said buffer; and
- a user defined data field that is not modified by said microengines; and wherein said transmit buffer descriptors comprise:
- a next buffer descriptor field for storing a pointer to a next buffer descriptor in a chain of buffer descriptors;

wherein said port specific section of said CSR block comprises an Ethernet specific component comprising a physical address component and a transmitter and receiver control register to enable transmitting or receiving, and comprises an ATM specific component comprising a physical address component and a transmitter and receiver control register to enable transmitting or receiving;

wherein said receive buffer descriptors comprise:
- a next buffer descriptor field for storing a pointer to a next buffer descriptor in a chain of buffer descriptors;
- a control/status field comprising information for distinguishing between receive and transmit buffer descriptors, and if said receive buffer descriptor is Ethernet specific comprising information about said underlying information packets, or if said receive buffer descriptor is ATM specific an interrupt bit causing said microengine to send an interrupt to said core processor;
- a port number field comprising network and interface specific information;
- a data length field comprising the number of bytes containing said underlying information packet read into a buffer;
- a data size field comprising the maximum number of bytes that can be read into said buffer;
- a data location field comprising a pointer to the beginning of said buffer; and
- a user defined data field that is not modified by said microengines; and wherein said transmit buffer descriptors comprise:
- a next buffer descriptor field for storing a pointer to a next buffer descriptor in a chain of buffer descriptors;
- a control/status field comprising information for distinguishing between receive and transmit buffer descriptors, and an interrupt bit causing the microengine to send an interrupt to said core processor;
- a port number field comprising network and interface specific information;
- a data length field comprising the number of bytes containing said underlying information packet read into a buffer;
- a data location field comprising a pointer to the beginning of said buffer; and
- a user defined data field that is not modified the microengine.

* * * * *

UNITED STATES PATENT AND TRADEMARK OFFICE
CERTIFICATE OF CORRECTION

| | |
|---|---|
| PATENT NO. | : 7,180,887 B1 |
| APPLICATION NO. | : 10/037186 |
| DATED | : February 20, 2007 |
| INVENTOR(S) | : Curtis Schwaderer, David Lyons and Rick Stoen |

It is certified that error appears in the above-identified patent and that said Letters Patent is hereby corrected as shown below:

In Column 1, Line 27, replace "decision" with --decisions--.

In Column 1, Line 65, replace "facilitate" with --facilitates--.

In Column 2, Line 46, delete "to ".

In Column 3, Line 52, replace "LC-Tri" with --LC-Trie--.

In Column 4, Line 42, replace "principal" with --principle--.

In Column 5, Line 33, delete "1– 5 ".

In Column 6, Line 25, replace "in appearing in" with --appearing in--.

In Column 6, Line 27, before "entry", insert --" – "--.

In Column 6, Line 46, after "to ", insert --the--.

In Column 7, Line 46, replace "accessable" with --accessible--.

In Column 10, Line 42, replace "deleing" with --deleting--.

In Column 11, Line 9, replace "goal of the searching" with --goal of searching--.

In Column 11, Line 15, after "string ", insert --to --.

In Column 12, Line 12, replace "do" with --due--.

In Column 13, Line 21, replace "BIT 2" with --BIT 0--.

In Column 13, Line 56, replace "and" with --then--.

In Column 14, Line 39, replace "an" with --a--.

In Column 14, Line 40, replace "he" with --the--.

In Column 15, Line 21, after "if", the first time it appears, insert --the --.

In Column 15, Line 37, after "message", insert --and --.

UNITED STATES PATENT AND TRADEMARK OFFICE
CERTIFICATE OF CORRECTION

PATENT NO. : 7,180,887 B1
APPLICATION NO. : 10/037186
DATED : February 20, 2007
INVENTOR(S) : Curtis Schwaderer, David Lyons and Rick Stoen It is certified that error appears in the above-identified patent and that said Letters Patent is hereby corrected as shown below:

In Column 15, Line 39, replace "affect" with --effect--.

In Column 15, Line 62, replace "SN_ADDR:" with --SIN_ADDR:--.

In Column 16, Line 6, replace "_–s" with --s--.

In Column 16, Line 13, replace "00 00 00" with --00 00 00 00 00 00--.

In Column 16, Line 14, delete the entire line.

In Column 16, Line 26, replace "of the each" with --of each--.

In Column 17, Line 20, replace "RTA_OIE" with --RTA_OIF--.

In Column 17, Line 55, replace "entries" with --entry's--.

In Column 18, Line 13, replace "effected" with --affected--.

In Column 18, Line 25, replace "2{" with --{--.

In Column 18, Line 49, after "entries", the first time it appears, insert --of the --.

In Column 18, Line 60, replace "be" with --by--.

In Column 19, Line 6, after "of ", insert --the --.

In Column 19, Line 33, after "Skip, ", insert --and --.

In Column 19, Line 48, delete "of ".

In Column 20, Line 17, replace "avoid" with --avoiding--.

In Column 20, Line 25, replace "affect" with --effect--.

In Column 20, Line 56, replace "Offest" with --Offset--.

In Column 20, Line 59, replace "Offest" with --Offset--.

In Column 22, Line 19, replace "This" with --The--.

UNITED STATES PATENT AND TRADEMARK OFFICE
CERTIFICATE OF CORRECTION

PATENT NO. : 7,180,887 B1
APPLICATION NO. : 10/037186
DATED : February 20, 2007
INVENTOR(S) : Curtis Schwaderer, David Lyons and Rick Stoen It is certified that error appears in the above-identified patent and that said Letters Patent is hereby corrected as shown below:

In Column 22, Line 39, replace "interfaces" with --interface's--.

In Column 25, Line 63, replace "the" with --be--.

In Column 27, Line 42, after "through", insert -- 6--.

In Column 29, Line 55, replace "comprises" with --comprise--.

In Column 32, Line 22, replace "describe" with --describes--.

In Column 33, Line 26, replace "data, after" with --data. After--.

In Column 33, Line 29, replace "queue, if" with --queue. If--.

In Column 33, Line 30, replace "generated, if" with --generated. If--.

In Column 35, Line 11, replace "ATM_Port atm_ort" with --ATM_port atm_port--.

In Column 35, Line 29, replace "elements" with --element--.

In Column 36, Line 39, replace "elements" with --element--.

In Column 36, Line 56, replace "bluffer" with --buffer--.

In Column 37, Line 11, replace "elements" with --element--.

In Column 37, Line 44, replace "elements" with --element--.

In Column 37, Line 46, before "computing system", insert --A --.

UNITED STATES PATENT AND TRADEMARK OFFICE
CERTIFICATE OF CORRECTION

| | | |
|---|---|---|
| PATENT NO. | : 7,180,887 B1 | |
| APPLICATION NO. | : 10/037186 | |
| DATED | : February 20, 2007 | |
| INVENTOR(S) | : Curtis Schwaderer, David Lyons and Rick Stoen | |

It is certified that error appears in the above-identified patent and that said Letters Patent is hereby corrected as shown below:

In Column 40, Line 63, after "modified", insert --by --.

Signed and Sealed this

Eighth Day of May, 2007

JON W. DUDAS
*Director of the United States Patent and Trademark Office*